(12) United States Patent
Yamashita

(10) Patent No.: US 8,405,914 B2
(45) Date of Patent: Mar. 26, 2013

(54) ZOOM LENS AND IMAGE PICKUP APPARATUS

(75) Inventor: Atsushi Yamashita, Sagamihara (JP)

(73) Assignee: Konica Minolta Opto, Inc., Tokyo (JP)

( * ) Notice: Subject to any disclaimer, the term of this patent is extended or adjusted under 35 U.S.C. 154(b) by 316 days.

(21) Appl. No.: 12/638,788

(22) Filed: Dec. 15, 2009

(65) Prior Publication Data
US 2010/0182704 A1    Jul. 22, 2010

(30) Foreign Application Priority Data

Jan. 21, 2009  (JP) .................................. 2009-010717

(51) Int. Cl.
*G02B 15/14*    (2006.01)
(52) U.S. Cl. .......................... 359/676; 359/726; 359/737
(58) Field of Classification Search .................. 359/676, 359/678, 684, 726–729, 737; 396/72–88; 348/240.99–240.3, 335–369
See application file for complete search history.

(56) References Cited

U.S. PATENT DOCUMENTS

| 7,253,962 | B2 * | 8/2007 | Sano .............................. 359/684 |
| 7,365,911 | B2 * | 4/2008 | Yamashita et al. ............ 359/676 |
| 2006/0274426 | A1 * | 12/2006 | Sueyoshi ...................... 359/676 |
| 2008/0239506 | A1 * | 10/2008 | Ori ................................ 359/676 |
| 2008/0252994 | A1 * | 10/2008 | Matsui .......................... 359/695 |

FOREIGN PATENT DOCUMENTS

| JP | 2007-034064 | 2/2007 |
| JP | 2007-219316 | 8/2007 |

* cited by examiner

*Primary Examiner* — Darryl J Collins
(74) *Attorney, Agent, or Firm* — Cozen O'Connor

(57) ABSTRACT

A zoom lens includes: a first lens group with a positive refractive power, including a reflection optical element; a second lens group with a negative refractive power; a third lens group with a positive refractive power; a fourth lens group with a positive refractive power; and a fifth lens group with a negative refractive power. A power of the zoom lens varies by moving the second lens group, the fourth lens group, and the fifth lens group along an optical axis. A negative lens in the first lens group or a positive lens in the second lens group satisfies the predetermined conditions relating to a refractive index and an Abbe number.

28 Claims, 26 Drawing Sheets

ZOOM LENS AND IMAGE PICKUP APPARATUS

This application is based on Japanese Patent Application No. 2009-010717 filed on Jan. 21, 2009, in Japanese Patent Office, the entire content of which is hereby incorporated by reference.

TECHNICAL FIELD

The present invention relates to a zoom lens, and an image pickup apparatus provided with the zoom lens. The zoom lens is suitable for a digital camera and a video camera equipped with CCD (charge coupled device) or CMOS (complementary metal oxide semiconductor), and has a variable power ratio of 2.5 or more and an angle of view of about 60 degrees at the wide-angle end. Further, the zoom lens can make the thickness size of a camera small.

BACKGROUND

In a digital still camera and video camera using CCD or CMOS, a demand of zoom lenses which can make thickness of a camera thin is increasing. Many thin cameras employ a light-bending optical system which bends an optical axis at 90 degrees with a reflection optical element such as a prism, and they are disclosed in Patent Gazettes, for example, JP-A Nos. 2007-34064 and 2007-219316.

SUMMARY

JP-A Nos. 2007-34064 and 2007-219316 disclose the following zoom lenses. One of the zoom lenses is formed as simple as a 3-lens-group construction. However, the zoom lens employs a thick prism and the f-number at the wide-angle end is insufficient. Another zoom lens is formed as a 4-lens-group construction and f-number of the zoom lens is comparatively sufficient. However, the zoom lens also employs a thick prism, and its total optical length is long. Therefore, these zoom lenses hardly satisfy the requirements about their compactness and speed.

The present invention has been achieved in view of this problem, and provides a zoom lens, and an image pickup apparatus equipped with this zoom lens, where the zoom lens makes the thickness of a camera thin and has a preferably maintained f-number in spite of its short total length, and aberrations in the zoom lens are corrected in a good condition.

An embodiment of the present invention is a zoom lens for forming an image of an object on an image pickup surface of an image pickup element. The zoom lens comprises, in order from an object side thereof: a first lens group with a positive refractive power; a second lens group with a negative refractive power; a third lens group with a positive refractive power; a fourth lens group with a positive refractive power; and a fifth lens group with a negative refractive power. A power of the zoom lens varies by moving the second lens group, the fourth lens group, and the fifth lens group along an optical axis. The first lens group comprises a reflection optical element for bending an optical path by reflecting a light flux, a positive lens, and a negative lens satisfying the predetermined conditions.

Another embodiment of the invention is a zoom lens for forming an image of an object on an image pickup surface of an image pickup element. The zoom lens comprising, in order from an object side thereof: a first lens group with a positive refractive power; a second lens group with a negative refractive power; a third lens group with a positive refractive power; a fourth lens group with a positive refractive power; and a fifth lens group with a negative refractive power. A power of the zoom lens varies by moving the second lens group, the fourth lens group, and the fifth lens group along an optical axis. The first lens group comprises a reflection optical element for bending an optical path by reflecting a light flux. The second lens group comprises a positive lens satisfying the predetermined conditions, and a negative lens.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF EMBODIMENTS

Figure 1:
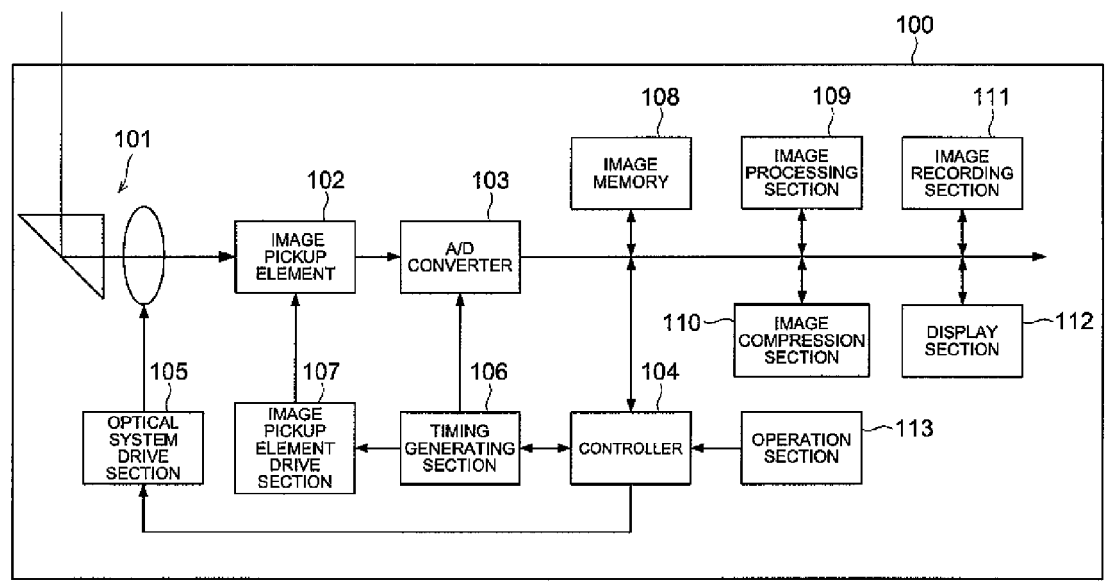
FIG. 1 is a block diagram showing an image pickup apparatus.

An embodiment of the invention will be explained as follows.

An embodiment of the present invention is a zoom lens for forming an image of an object on an image pickup surface of an image pickup element. The zoom lens comprising, in order from an object side thereof: a first lens group with a positive refractive power; a second lens group with a negative refractive power; a third lens group with a positive refractive power; a fourth lens group with a positive refractive power; and a fifth lens group with a negative refractive power. A power of the zoom lens varies by moving the second lens group, the fourth lens group, and the fifth lens group along an optical axis. The first lens group comprises a reflection optical element for bending an optical path by reflecting a light flux, a positive lens, and a negative lens satisfying the following expressions.

$$n_{1n} > 1.90 \tag{1}$$

$$v_{1n} < 25 \tag{2}$$

In the expressions, $n_{1n}$ is a refractive index of the negative lens in the first lens group at d line, and $v_{1n}$ is an Abbe number of the negative lens in the first lens group.

In the above zoom lens, the negative lens preferably satisfies the following expressions.

$$n_{1n} > 1.93 \tag{3}$$

$$v_{1n} < 20 \tag{4}$$

There is knows a zoom lens formed as a 4-lens-group construction with positive, negative, positive, and positive powers, as a typical lens in which a positive lens group is positioned ahead. In many of such the zoom lenses, only the second lens group is moved for varying the power of the zoom lens. This type of operation tends to apply a load factor of varying the power only to one lens group, and to enlarge a power of the lens group for varying the power when the zoom lens is tried to be shortened. It may cause a deterioration of an optical property of the zoom lens and an increase of error sensitivity when varying the power of the zoom lens. In order to avoid the deterioration of the optical property and the increase of error sensitivity, the movement amount of the lens group can be increased when varying the power. However, it affects the compactness of the zoom lens.

By moving a plurality of lens groups for varying the power as the above embodiment, the power varying function of the zoom lens can be shared with the respective lens groups. Therefore, the power of each lens group does not become excessively large, or the movement amount of each lens group does not become excessively large. It enables to make a compactness and excellent optical property of the zoom lens compatible. Further, when the focal point of the zoom lens moves because of the movement of the second lens group and the fourth lens group for varying the power of the zoom lens, the focus movement can be corrected by the movement of the other lens group. Thereby, it can achieve a zoom lens which exhibits a high variable power, compactness in size, and excellent optical property.

By arranging the reflection optical element in the first lens group as the above structure to bend the optical path, the camera thickness can be made thinner compared with the structure in which the optical path is bent at any one of the second lens group and succeeding lens groups.

Further, by arranging the negative lens and the positive lens in the first lens group, an astigmatism and magnification chromatic aberration caused in the first lens group can be controlled to be small.

By providing the negative lens satisfying the conditional expression (1), the negative lens exhibits a desired amount of negative refractive power in spite of its comparatively large curvature radius. Therefore, generation of aberrations such as distortion can be suppressed small, and the diameter of the front lens can be reduced. Since the first lens group has a positive refractive power, achromaticism in the first lens group is effectively secured by providing comparatively large chromatic dispersion to the negative lens in the lens group, as the conditional expression (2). It provides an excellent optical performance of the zoom lens. If the conditional expression (3) and (4) is satisfied, the effect will further more increase.

In the above zoom lens, it is preferable that the negative lens in the first lens group is arranged at a closer position to the object than the reflection optical element, and the zoom lens satisfies the following expression.

$$3 < d_{L1PR}/(2Y/f_W) < 7 \tag{5}$$

In the expression, $d_{L1PR}$ is a distance along the optical axis from a tip of an object side surface of the negative lens in the first lens group to a reflection surface of the reflection optical element, 2Y is a diagonal length of the image pickup element, and $f_W$ is a focal length of a total system of the zoom lens at a wide-angle end.

In the above zoom lens, it is more preferable that the negative lens in the first lens group is arranged at a closer position to the object than the reflection optical element, and the zoom lens satisfies the following expression.

$$4 < d_{L1PR}/(2Y/f_W) < 6 \tag{6}$$

By arranging the negative lens at the closer position to the object than the reflection optical element as the above structures, the aperture of the reflection optical element can be decreased and the thickness of the camera can be made thin.

The conditional expression (5) specifies the relations in the first lens group of the following values: distance $dL_{1PR}$ along the optical axis from the object side surface of the lens located in front of the reflection optical element to the reflection surface of the reflection optical element; diagonal length 2Y of an image pickup element; and focal length $f_W$ of the total system of the zoom lens at the wide-angle end. When a value of the conditional expression (5) is greater than the lower limit, the distance from the object side surface of the lens located in front of the reflection optical element to the reflection surface of the reflection optical element is not too small, compared with the angle of view at the wide-angle end. It makes the diameter of the front lens at the wide-angle end small, and it does not affect a correction of off-axis aberrations, and secures excellent optical performance of the zoom lens. When a value of the conditional expression (5) is below the upper limit, the thickness size of a camera is not excessively enlarged, and compactness is not spoiled. When the conditional expression (6) is satisfied, the effect will further more increase.

In the above zoom lens, it is preferable that the second lens group comprises a positive lens satisfying the following expressions, and a negative lens.

$$n_{2p} > 1.90 \tag{7}$$

$$v_{2p} < 25 \tag{8}$$

In the expressions, $n_{2p}$ is a refractive index of the positive lens in the second lens group at d line and $v_{2p}$ is an Abbe number of the positive lens in the second lens group.

By arranging a negative lens and a positive lens in the first lens group as the above structure, and employing a high-refractive-index and high-dispersion material for the positive lens, the astigmatism and magnification chromatic aberration generated in the lens group can be controlled to be small. Especially, the positive lens preferably satisfies the conditional expressions (7) and (8). By using the material with high refractive index for the positive lens, the positive Petzval's sum becomes small and it controls curvature of field to be small.

Another embodiment is a zoom lens for forming an image of an object on an image pickup surface of an image pickup element, where the zoom lens comprises, in order from an object side thereof: a first lens group with a positive refractive power; a second lens group with a negative refractive power; a third lens group with a positive refractive power; a fourth lens group with a positive refractive power; and a fifth lens group with a negative refractive power. A power of the zoom lens varies by moving the second lens group, the fourth lens group, and the fifth lens group along an optical axis. The first lens group comprises a reflection optical element for bending an optical path by reflecting a light flux. The second lens group comprises a positive lens satisfying the following expressions, and a negative lens.

$$n_{2p} > 1.90 \quad (7)$$

$$v_{2p} < 25 \quad (8)$$

In the expressions, $n_{2p}$ is a refractive index of the positive lens in the second lens group at d line and $v_{2p}$ is an Abbe number of the positive lens in the second lens group.

In the above embodiment, it is preferable that the negative lens in the second lens group satisfies the following expressions.

$$n_{2p} > 1.93 \quad (9)$$

$$v_{2p} < 20 \quad (10)$$

By moving a plurality of lens groups for varying the power as the above embodiment, the variable power function of the zoom lens can be shared with the respective lens groups. Therefore, the power of each lens group does not become excessively large, or the movement amount of each lens group does not become excessively large. It enables to make a compactness and excellent optical property of the zoom lens compatible. Further, when the focal point of the zoom lens moves because of the movement of the second lens group and the fourth lens group for varying the power of the zoom lens, the focus movement can be corrected by the movement of the other lens group. Thereby, it can achieve a zoom lens which exhibits a high variable power, compactness in size, and excellent optical property.

By arranging the reflection optical element in the first lens group as the above structure to bend the optical path, the camera thickness can be made thinner compared with the structure in which the optical path is bent at any one of the second lens group and succeeding lens groups.

By arranging the negative lens and the positive lens in the first lens group as the above structure, and employing a high-refractive-index and high-dispersion material for the positive lens, the astigmatism and magnification chromatic aberration generated in the lens group can be controlled to be small. Especially, the positive lens preferably satisfies the conditional expressions (7) and (8). When the conditional expressions (9) and (10) are satisfied, the effect will further more increase. By using the material with high refractive index for the positive lens, the positive Petzval's sum becomes small and it controls curvature of field to be small.

In the above zoom lens, it is preferable that the first lens group comprises a positive lens and a negative lens satisfying the following expressions.

$$n_{1n} > 1.90 \quad (1)$$

$$v_{1n} < 25 \quad (2)$$

By arranging the negative lens and the positive lens in the first lens group, an astigmatism and magnification chromatic aberration caused in the first lens group can be controlled to be small.

By providing the negative lens satisfying the conditional expression (1), the negative lens exhibits a desired amount of negative refractive power in spite of its comparatively large curvature radius. Therefore, generation of aberrations such as distortion can be suppressed small, and the diameter of the front lens can be reduced. Since the first lens group has a positive refractive power, achromaticism in the first lens group is effectively secured by providing comparatively large chromatic dispersion to the negative lens in the lens group, as the conditional expression (2). It provides an excellent optical performance of the zoom lens.

The above zoom lens preferably satisfies the following expression.

$$0.4 < |f_2/f_W| < 1.0 \quad (11)$$

In the expression, $f_2$ is a focal length of the second lens group, and $f_W$ is a focal length of a total system of the zoom lens at a wide-angle end.

The above zoom lens more preferably satisfies the following expression.

$$0.5 < |f_2/f_W| < 0.9 \quad (12)$$

The following advantages are obtained by providing the focal length of the second lens group satisfying the conditional expression (11). That is, the negative refractive power of the second lens group is properly maintained when a value of the conditional expression (11) exceeds the lower limit. It enables to reduce the movement amount of the second lens group when achieving a desired zoom ratio. It shortens the overall length of a zoom lens. The negative refractive power of the second lens group does not become excessively large when a value of the conditional expression (11) is less than the upper limit. It controls generation of aberrations in the second lens group and the aberration variation by decentration and shape error of lenses. If the conditional expression (12) is satisfied, the above effect will further more increase.

It is preferable that the above zoom lens further comprising an aperture stop arranged in the vicinity of the third lens group, wherein the third lens group comprises an aspheric surface and the third lens group is statically positioned for varying the power of the zoom lens.

By arranging an aperture stop at the almost center of the zoom lens, namely, the vicinity of the third lens group, off-axis aberrations can be corrected with sufficient balance and it becomes difficult to produce a great difference in the front lens diameter and the back lens diameter. Therefore, it brings an advantage that a shape of the lens unit is easily made to be flat in a camera thickness direction, and that the element in the camera can be easily aligned. Further, the third lens group is located to be sufficiently away from image pickup element. Therefore, it is fully easy to secure the telecentricity demanded by a CCD and CMOS optical system.

When the third lens group is positioned close to the opening aperture, the spherical aberration and coma are greatly affected. However, by providing an aspheric surface in the third lens group, these aberrations can be corrected in a good condition. Especially, when achieving an optical system with sufficient f-number, a beam passing through the lens group becomes thick. Even in that case, the aspheric surface provides a large effect to correct the aberrations.

In the above zoom lens, the third lens group preferably consists of one positive lens.

By providing the third lens group formed by just one positive lens, the space where the third lens group occupies is small, and the space where the second lens group and the fourth lens group is movable when the power of the zoom lens varies, is easily secured.

It is preferable that, in the above zoom lens, a lens arranged at a closest position to the object in the fourth lens, comprises an aspheric surface.

In the zoom lens, the on-axis light flux passes through the third lens group, then, becomes an almost parallel light flux to enter the fourth lens group. Therefore, aberrations such as the spherical aberration can also be corrected by providing an aspheric surface on the lens surface at the closest position to the object in the fourth lens group. Especially, when achieving an optical system with sufficient f-number, a beam passing through the lens group becomes thick. Even in that case, the aspheric surface provides a large effect to correct the aberrations.

The above zoom lens preferably satisfies the following expression.

$$1.0 < f_4/f_W < 2.0 \quad (13)$$

In the expression, $f_4$ is a focal length of the fourth lens group, and $f_W$ is a focal length of a total system of the zoom lens at a wide-angle end.

The above zoom lens more preferably satisfies the following expression.

$$1.2 < f_4/f_W < 1.8 \quad (14)$$

The following advantages are obtained when the focal length of the fourth lens group satisfies the conditional expression (13). That is, the positive refractive power of the fourth lens group is properly maintained when a value of the conditional expression (13) exceeds the lower limit. It reduces the movement amount of the fourth lens group when achieving a desired zoom ratio, and total length of the zoom lens can be shortened. When a value of the conditional expression (13) is lower than the upper value, the positive refractive power of the fourth lens group does not become excessively large. It controls the aberration generation and aberration variation due to a decentration and a shape error in the fourth lens group. If the conditional expression (14) is satisfied, the effect will further more increase.

In the above zoom lens, it is preferable that the zoom lens adjusts a focal point from an infinity distance to a finite distance by moving the fifth lens group.

In the above structure, the fifth lens group moves when the focal point is adjusted from an infinity object to a short distance object. When the focal point is adjusted by the second lens group and the fourth lens group, the second lens group needs to be moved to the image side and the fourth lens group needs to be moved to the object side, which requires to secure air spacing between the second lens group and the third lens group and between the fourth lens group and the third lens group, especially at the telephoto end. As a result, it will become difficult to maintain the compactness of the lens system. On the other hand, it is comparatively easy to secure air spacing required for adjusting the focal point, in the fifth lens group, without affecting the total length of the optical system. Therefore, it realizes a zoom lens with little power consumption, simple structure, and excellent compactness.

In the above zoom lens, it is preferable that the fifth lens group consists of one negative plastic lens and satisfies the following expression.

$$|f_W/f_5| < 0.8 \quad (15)$$

In the expression, $f_W$ is a focal length of a total system of the zoom lens at a wide-angle end, and $f_5$ is a focal length of the fifth lens group.

In the above zoom lens, it is more preferable that the fifth lens group consists of one negative plastic lens and satisfies the following expression.

$$|f_W/f_5| < 0.5 \quad (16)$$

By forming the fifth lens group by just one negative lens, the load to a lens drive mechanism is lightened to the minimum.

By making the lens in the fifth lens group out of a plastic lens, the lens can easily employ an aspheric surface which is effective for correction of aberrations such as astigmatism. It further saves the weight of the fifth lens group which is movable at least when the power of the zoom lens varies. Therefore, the load to lens drive mechanism can be controlled to be small. Plastic lenses can be mass-produced by injection molding, and they contribute also to cost reduction. As for a plastic lens, its refractive index and shape change according to a temperature change. When controlling the refractive power of a plastic lens within the limits of the conditional expression (15), it can reduce the change of the optical performance due to the refractive index and shape change of the plastic lens. It is more preferable if the conditional expression (16) is satisfied.

It is preferable that the above zoom lens further comprises a sixth lens group with a positive refractive power, consisting of one positive plastic lens, arranged at a closer position to the image than the fifth lens group, and satisfying the following expression.

$$f_W/f_6 < 0.15 \quad (17)$$

In the expression, $f_W$ is a focal length of a total system of the zoom lens at a wide-angle end, and $f_6$ is a focal length of the sixth lens group.

It is more preferable that the above zoom lens further comprises a sixth lens group with a positive refractive power, consisting of one positive plastic lens, arranged at a closer position to the image than the fifth lens group, and satisfying the following expression.

$$f_W/f_6 < 0.10 \quad (18)$$

The above structure has an advantage that the telecentricity of the zoom lens can be maintained in a good condition by the convergence action of the sixth lens group with a positive power.

By constituting the sixth lens group by one plastic aspheric lens, it can contribute to the weight saving and the cost saving of the zoom lens. By satisfying the conditional expression (17), the sixth lens group can control the change of the optical performance due to a temperature change to be small. It is more preferable when the conditional expression (18) can be satisfied.

Another embodiment is an image pickup apparatus, comprising: an image pickup element comprising a photoelectric converter, and one of the above zoom lenses.

This embodiment exhibits an effect which is same to the above-described zoom lenses as the embodiments of the present invention.

These embodiments can provide a zoom lens and an image pickup apparatus equipped with the zoom lens, where a camera on which the zoom lens is mounted can be downsized in its thickness direction, and the zoom lens can provide a sufficiently maintained f-number, though its total length is short. Further, various aberrations can be corrected in the zoom lens.

Figure 2:
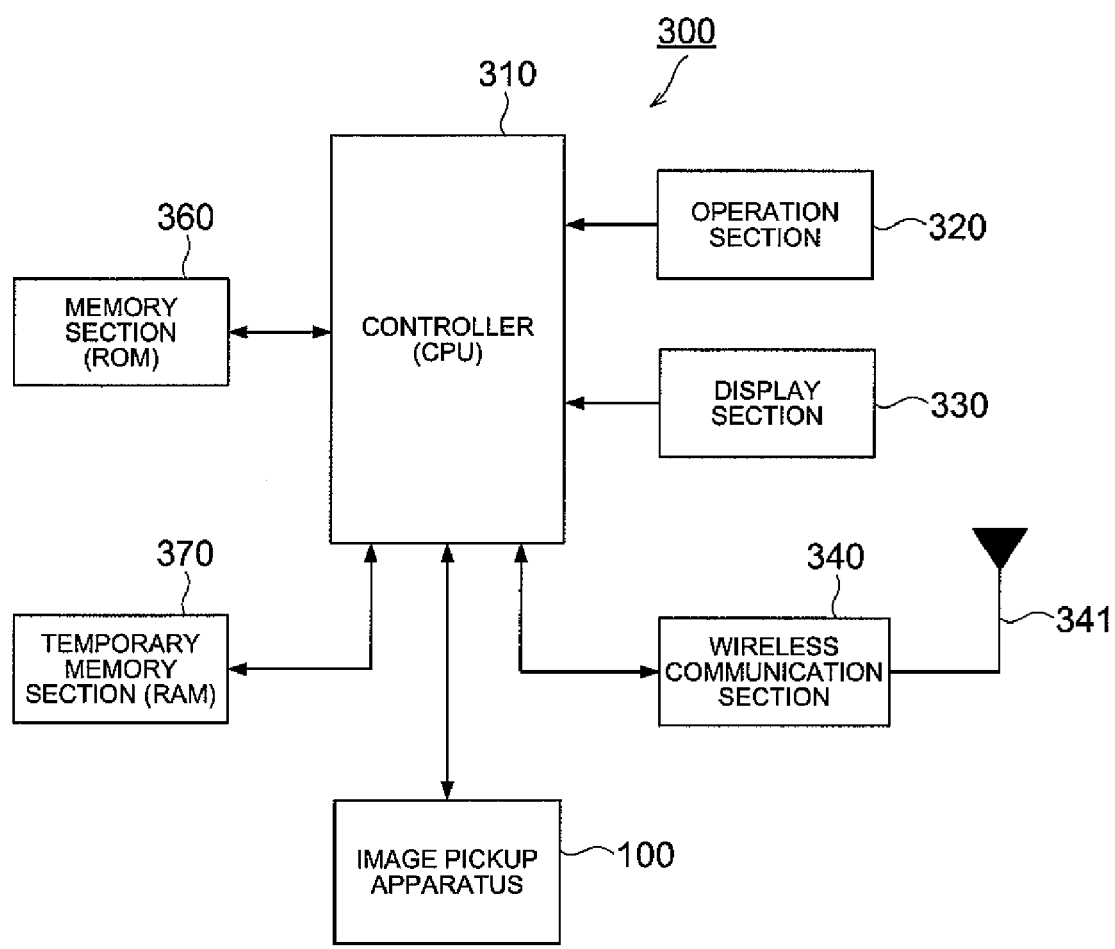
FIG. 2 is a block diagram showing an internal structure of a mobile phone.

The image pickup apparatus carrying the zoom lens of the present embodiment thereon will be described with reference to FIG. 1 and FIG. 2. FIG. 1 is a block diagram of an image pickup apparatus.

In FIG. 1, image pickup apparatus 100 is constituted by zoom lens 101, image pickup element 102, A/D converter 103, controller 104, optical system drive section 105, timing generating section 106, image pickup element drive section 107, image memory 108, image processing section 109, image compression section 110, image recording section 111, display section 112, and operation section 113.

Zoom lens 101 has a function to form an object image on an image pickup surface of image pickup element 102.

Image pickup element 102 is composed of CCD (charge coupled device) or CMOS (complementary metal oxide semiconductor). The image pickup element 102 photoelectrically converts an incident light for every RGB signals, and outputs analog signals.

A/D converter 103 changes analogue signals into digital image data.

Controller 104 controls each part of image pickup apparatus 100. Controller 104 includes CPU (Central Processing Unit), RAM (Random Access Memory), and ROM (Read Only Memory) and carries out various processing by working jointly with CPU and various programs which are read from ROM and developed into RAM.

Optical system drive section 105 carries out drive controlling of the zoom lens 101 for zooming, focusing, and exposure by control of controller 104.

Timing generation section 106 outputs timing signals for outputting analog signals.

Image pickup element drive section 107 controls the image pickup element 102 for scanning drive.

Image memory 108 stores image data to be readable from and writable on the memory.

Image processing section 109 carries out various image processing to image data.

Image compression section 110 compresses acquired image data with a compression method, such as JPEG (Joint Photographic Experts Group).

Image recording section 111 records image data on recording media which is set to a slot (which is not illustrated) such as a memory card.

Display section 112 is a device such as a color liquid-crystal panel. The display section 112 displays acquired image data, a through-lens image to be shot, and various operation screens.

Operation section 113 contains a shutter release button and various operation keys for setting up various operation modes. The operation section 113 outputs information inputted by a user's operation into controller 104.

Hereafter, the operation of image pickup apparatus 100 will be described. At the time of shooting an object, monitoring of the object (displaying through-lens image) and acquiring an image of the object are performed. In the monitoring operation, the object image shot by zoom lens 101 is formed on the light receiving surface of image pickup element 102. The image pickup element 102 is driven for scanning by timing generating section 106 and image pickup element drive section 107. The image pickup element 102 outputs analog signals equivalent to one frame for every constant period, and the analog signals are outputted as a photoelectric conversion output which corresponds to the optical image formed by the zoom lens.

After gain adjustment of this analog signals is suitably carried out for every primary color component of RGB, the analog signals are changed into digital data in A/D converter 103. The digital data is processed by a coloring process including a pixel interpolation process and Y correction process with image processing section 109. Then, luminance signal Y and color-difference signals Cb and Cr (corresponding to image data) are generated as digital values, to be stored in image memory 108. The signals are read periodically, and video signals are generated to be outputted to display section 112.

This display section 112 functions as an electronic finder in the monitoring operation, to display an image to be shot in real time. In this condition, zooming, focusing, and exposure for zoom lens 101 are set up by driving optical system drive section 105, in response to an operational input carried out by a user through operation section 113 at any time.

In the above monitoring condition, when a user operates a shutter release button in operation section 113, still picture information is shot. Corresponding to the operation of the shutter release button, image data which has been stored in image memory 108 and is equivalent to one frame, is outputted and the image data is compressed by image compression section 110. The compressed image data is recorded on a recording media by image recording section 111.

Above-mentioned image pickup apparatus 100 is an example of the suitable image pickup apparatus for the present invention, and is not limited to this.

That is, as an image pickup apparatus carrying a zoom lens, there can be provided a digital still camera, a video camera, a mobile phone with an image pick-up function, PHS (Personal Handyphone System), PDA (Personal Digital Assistant).

Next, with reference to FIG. 2, an example of mobile phone 300 carrying image pickup apparatus 100 will be described. FIG. 2 is a block diagram showing the internal configuration of a mobile phone.

Mobile phone 300 includes controller (CPU) 310, operation section 320, display section 330, wireless communications section 340, image pickup apparatus 100, memory section (ROM) 360, temporary memory section (RAM) 370. The controller 310 controls various parts together and executes programs according to various processing. The operation section 320 is provided for inputting information such as numbers by an operation of keys. The display section 330 displays an acquired image besides prescribed data. The wireless communications section 340 is provided for realizing a communication of various information with external servers antenna 341. The memory section (ROM) 360 stores required various data such as a system program of mobile phone 300, various processing programs, terminal ID. The temporary memory section (RAM) 370 is used as workspace which stores temporarily various processing programs and data executed by controller 310, processed data, or the image data taken by image pickup apparatus 100.

Controller 104 in image pickup apparatus 100 and controller 310 in mobile phone 300 are connected so as to transmit a communication with each other. In this case, functions of display section 112 and operation section 113 shown in FIG. 1 can be transferred to the mobile phone 300. The operation of image pickup apparatus 100 in this case is fundamentally the same as the embodiment of FIG. 1. More concretely, the external connection terminal (which is not illustrated) of image pickup apparatus 100 is connected with controller 310 of mobile phone 300, and a shutter-release signal is transmitted to the image pickup apparatus 100 from the mobile phone 300 to acquire the object image. Image signals acquired after shooting the image, such as a luminance signal and a color-difference signal, are outputted to the controller 310 from the image pickup apparatus 100. The image signals can be stored in memory section 360 with control system of mobile phone 300, or is displayed on display section 330. They can further be transmitted outside as image information via wireless communication section 340.

In addition, an image pickup apparatus carrying a zoom lens may be a camera module which has only an image pickup element mounted on a substrate and which can be connected through a connector with an external equipment provided with a controller, image processing section, and display section.

EXAMPLES

Examples of the zoom lens suitable for the embodiments mentioned above will be described. However, the present invention is not limited by these examples.

Block diagrams of the zoom lenses in Examples 1-6 are shown in FIGS. 3, 7, 11, 15, 19, and 23. Each of the block diagrams for the examples shows a zoom lens at a wide-angle end. Each block diagram shows first lens group L1, second lens group L2, third lens group L3, fourth lens group L4, fifth lens group L5, aperture stop S, low pass filter and a cover glass Fi, imaging surface P, and reflection optical element Re in the first lens group L1. Each of the block diagrams for the examples excluding FIG. 11 further shows sixth lens group L6. An Arrow in the diagrams represents a direction of the movement of a lens group at the time when the power of the zoom lens changes from the wide-angle end.

The zoom lens in each of Examples 1, 2, 4, 5 and 6 comprises 6 lens groups having positive, negative, positive, positive, negative, and positive powers, in this order from the object side. When the zoom lens changes its power, the second lens group L2 moves to the image side, and the fourth lens group L4 and the fifth lens group L5 move to the object side. The zoom lens of Example 3 comprises 5 lens groups having positive, negative, positive, positive, negative powers, in this order from the object side. When the zoom lens changes its power, the second lens group L2 moves to the image side, and the fourth lens group L4 and the fifth lens group move to the object side.

By varying the power of the zoom lens by the movement of plural lens groups as shown in each example, the variable power function of the zoom lens can be shared with the respective lens groups. Therefore, a power of each lens group does not become excessively large, or movement amount of each lens group does not become excessively large. It enables to make a compactness and excellent optical property of the zoom lens compatible. Especially, it controls the movement amount of the second lens group L2 to be small, resulting in decreasing the distance from the first lens group L1 to aperture stop S. It reduces the diameter of the front lens of the second lens group and also reduces the diameter of the prism. It further makes the camera thin. Further, when the focal point of the zoom lens moves because of the movement of the second lens group L2 and the fourth lens group L4 for varying the power of the zoom lens, the movement of the focal point can be corrected by the movement of the other lens group. Thereby, it achieves a zoom lens which exhibits high variable power, compactness in size, and excellent optical property.

In each example, the first lens group L1 has positive refractive power. The first lens group L1 comprises a negative lens, reflection optical element Re which bends the optical axis at 90 degrees, and a positive lens, in the order from the object side. There is arranged a prism as the reflection optical element Re with an action which bends an optical path by reflecting a light flux in the first lens group L1. However, the reflection optical element may not be limited to the prism and it may be a mirror, for example. With constituting the reflection optical element with the prism, a beam diameter which passes through the inside of a reflection optical system becomes small. Therefore, the prism can be made small and it makes the camera thin. By forming the prism of a material with higher refractive index, the height of a ray which passes the prism can be controlled to be low. It also makes the camera thin. Since the angle of an off-axis ray can be reduced by arranging the negative lens in front of the prism, the diameter of the prism can be made still smaller. It also makes the camera still thin.

The above negative lens satisfies the conditional expressions (1) and (2). By providing the negative lens satisfying the conditional expression (1), the negative lens exhibits a desired amount of negative refractive power in spite of its comparatively large curvature radius. Therefore, generation of aberrations such as distortion can be suppressed small, and the diameter of the front lens can be reduced. Since the first lens group L1 has a positive refractive power, achromaticism in the first lens group L1 is effectively secured by providing comparatively large chromatic dispersion to the negative lens in the lens group, as the conditional expression (2). It provides an excellent optical performance of the zoom lens. If the conditional expression (3) and (4) is satisfied, the effect will further more increase.

Figure 3:
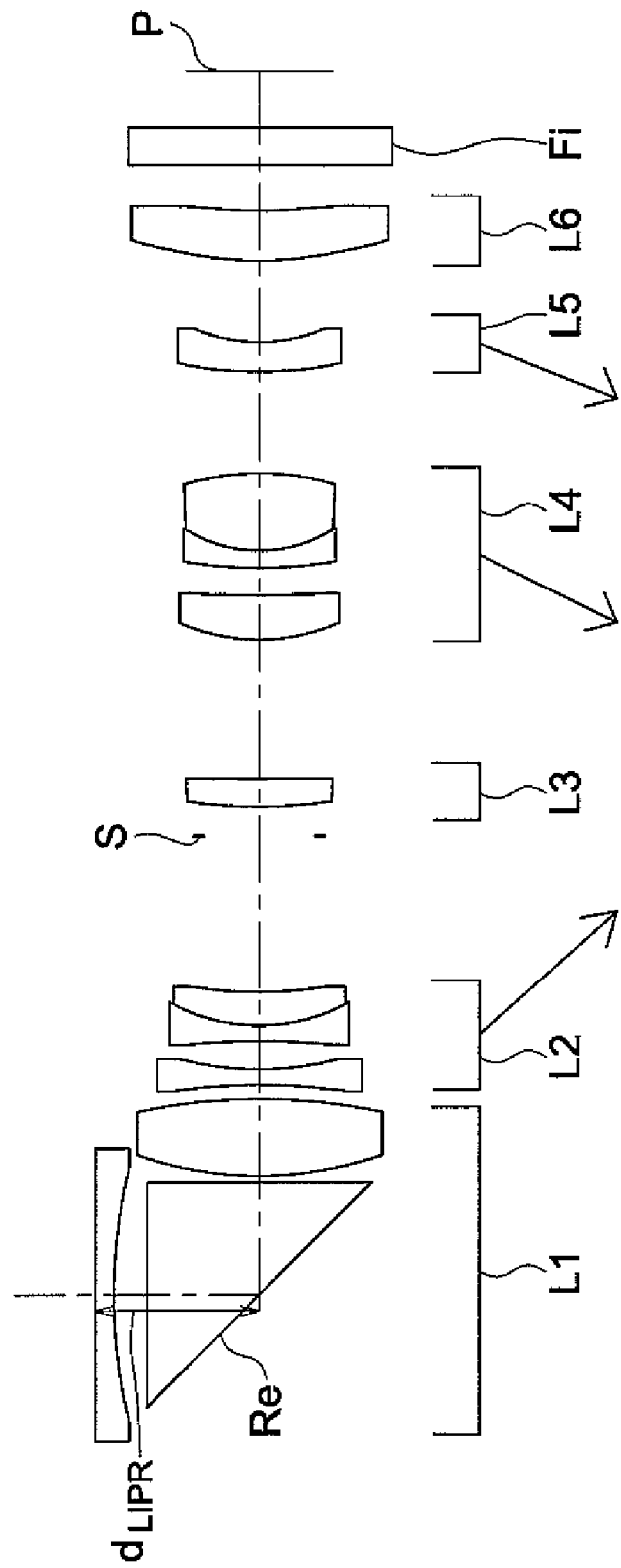
FIG. 3 is a diagram of a lens structure at the wide-angle end of Example 1.

The zoom lens of each example satisfies the conditional expression (5). The conditional expression (5) specifies the relations of the followings for the first lens group L1: distance $dL_{1PR}$ from the object side surface of the lens located in front of the reflection optical element to the reflection surface of the reflection optical element; diagonal length 2Y of an image pickup element; and focal length $f_W$ of the total system of the zoom lens at the wide-angle end. As an example, the distance $dL_{1PR}$ is shown in FIG. 3. When a value of the conditional expression (5) is greater than the lower limit, the distance from the object side surface of the lens located in front of the reflection optical element to the reflection surface of the reflection optical element is not too small, compared with the angle of view at the wide-angle end. It makes the diameter of the front lens at the wide-angle end small, and it does not affect a correction of off-axis aberrations, and secures excellent optical performance of the zoom lens. When a value of the conditional expression (5) is below the upper limit, the thickness size of a camera is not excessively enlarged, and compactness is not spoiled. When the conditional expression (6) is satisfied, the effect will further more increase.

In each example, the second lens group L2 has a negative refractive power, and comprises a negative lens and a cemented lens which consists of a negative lens and a positive lens.

Because the second lens group L2 includes two negative lenses and one positive lens, the negative power can be shared by two lenses, and it controls the distortion and astigmatism which are generated in the zoom lens especially at the wide-angle end. When a negative lens and a positive lens are joined and high-refractive-index and high-dispersion material is employed for the positive lens, and when low-refractive-index and low-dispersion material is employed for the negative lens, great refractive index difference and great dispersion difference can be given to both lenses. The chromatic aberration and monochromatic aberration which are generated in this lens group can be controlled to be small, and changes in these aberrations caused when varying the power of the zoom can also be made small. It is preferable to satisfy the conditional expression (7) and (8) especially for the positive lens. When the conditional expression (9) and (10) is satisfied, the effect will further more increase, which is further more preferable. Thus, by using a material with a high refractive index for the positive lens, it is able to reduce the positive Petzval's sum and to control the curvature of field to be small.

The following advantages are obtained by providing the focal length of the second lens group L2 satisfying the conditional expression (11). That is, the negative refractive power of the second lens group L2 is properly maintained when a value of the conditional expression (11) exceeds the lower limit. It enables to reduce the movement amount of the second lens group L2 when achieving a desired zoom ratio. It shortens the overall length of a zoom lens. The negative refractive power of the second lens group L2 does not become excessively large when a value of the conditional expression (11) is less than the upper limit. It controls generation of aberrations in the second lens group and the aberration variation by decentration and shape error of lenses. If the conditional expression (12) is satisfied, the above effect will further more increase.

The third lens group L3 has a positive refractive power, and constructed by one positive lens. The third lens group L3 is statically positioned when the zoom lens changes its power.

Since the third lens group has a weaker power in each example compared with other lens groups, the third lens group can control generation of aberrations such as a spherical aberration, a coma, a longitudinal chromatic aberration, to be small, despite of its simple construction such that it constructed by only one positive lens. Therefore, the space where the third lens group occupies is small, and the space where the second lens group L2 and the fourth lens group L4 is movable, is easily secured. When aperture stop S is arranged in the vicinity of the third lens group L3 which corresponds to the approximately center of the zoom lens, off-axis aberrations can be corrected with sufficient balance and it becomes difficult to produce a great difference in a front lens diameter and a back lens diameter. Therefore, it brings an advantage that a shape of the lens unit is easily made to be flat in a camera thickness direction, and that the element in the camera can be easily aligned. The third lens group L3 is located to be sufficiently away from image pickup element P, it is easy to secure the sufficient telecentricity demanded by a CCD and CMOS optical system. Since this lens group is located at the closest position to the aperture stop S in each example, aberrations such as a spherical aberration and coma can be corrected satisfactory by employing an aspheric surface in the lens group. Since each of an on-axis light flux and off-axis light flux which passes the lens group has a comparatively large diameter, the on-axis light flux and off-axis light flux are easily affected by a shape error of lens surface in the lens group, compared with the other portion of the zoom lens. In a molded aspherical lens, a surface-sinuosity error (aspheric surface error) is easy generated. Therefore, it is preferable to suppress the surface-sinuosity error (aspheric surface error) to be sufficiently small in this lens group. When the third lens L3 is defined to be statically positioned for varying the power of the zoom lens, aperture stop S and the third lens group L3 are not required to be moved as one body, and it simplifies a lens drive mechanism.

In each example, the fourth lens group L4 has a positive refractive power, and satisfies the conditional expression (13). The following advantages are acquired when the focal length of the fourth lens group L4 satisfies the conditional expression (13). That is, the positive refractive power of the fourth lens group L4 is properly maintained when a value of the conditional expression (13) exceeds the lower limit. It reduces the movement amount of the fourth lens group L4 when achieving a desired zoom ratio, and the total length of the zoom lens can be shortened. When a value of the conditional expression (13) is lower than the upper value, the positive refractive power of the fourth lens group L4 does not become excessively large. It controls the aberration generation and aberration variation due to a decentration and a shape error in the fourth lens group L4. If the conditional expression (14) is satisfied, the effect will further more increase.

In each example, the fifth lens group L5 has a negative refractive power. When the focal point is adjusted from an infinity object to a short distance object, the fifth lens group is moved to the image side. The fifth lens group is constructed only by one negative plastic lens, and the load to drive mechanism can be controlled to the minimum. When the focal point is adjusted by the second lens group L2 and the fourth lens group L4, the second lens group needs to be moved to the image side and the fourth lens group needs to be moved to the object side, which requires to secure air spacing between the second lens group and the third lens group, and between the fourth lens group and the third lens group, especially at the telephoto end. As a result, it will become difficult to maintain the compactness of the lens system. On the other hand, it is comparatively easy to secure air spacing required for adjusting the focal point, in the fifth lens group L5, without affecting the total length of the optical system. Therefore, it realizes a zoom lens with little power consumption, simple structure, and excellent compactness. By making the lens in the fifth lens group into a plastic lens, the lens can easily employ an aspheric surface which is effective for correction of aberrations such as astigmatism. It further saves the weight of the fifth lens group which is movable when the power of the zoom lens is varied and the focal point of the zoom lens is adjusted. The load to a lens drive mechanism can be controlled to be small. Plastic lenses can be mass-produced by injection molding, and it contributes also to cost reduction. As for a plastic lens, its refractive index and shape change according to a temperature change. When controlling the refractive power of a plastic lens within the limits of the conditional expression (15), it can reduce the change of the optical performance due to the refractive index and shape change of the plastic lens. It is more preferable if the conditional expression (16) is satisfied.

In Examples 1, 2, 4, 5 and 6, the zoom lens further includes the sixth lens group L6 that has a positive refractive power. That is, the zoom lens has a 6-group construction having positive, negative, positive, positive, negative, positive powers, in this order. The sixth lens group L6 is constructed by one positive plastic lens. When the 5-group construction with positive, negative, positive, positive, negative powers is compared with the 6-group construction with positive, negative, positive, positive, negative, positive powers, the latter one has an advantage that the zoom lens can keep telecentricity in a good condition by the convergence action of the sixth lens group with a positive power.

By constituting the sixth lens group L6 also by one plastic aspheric lens, it can effectively correct aberrations such as distortion with the simple construction, and it can contribute to the weight saving and the cost saving of the lens unit. By satisfying the conditional expression (17), the sixth lens group can control the change of the optical performance due to a temperature change to be small. It is more preferable that the conditional expression (18) is satisfied. Since the sixth lens group is statically arranged during varying the power of the zooming in Examples 1, 2, 4, 5 and 6, it exhibits a function to seal the space around the image pickup element more tightly, and to prevent dust from entering the image pickup element.

Each of the fifth lens group L5 and the sixth lens group L6 can provide an excellent optical performance by employing a glass mold lens with an aspheric surface and a lens with the compound (hybrid) aspheric surface made of glass and resin materials, other than a plastic aspheric lens.

When employing an infrared cut filter of a reflection type which is formed by performing a coating process on a surface of the lowpass filter in each example, it is not necessary to insert an absorbed type infrared cut filter glass to the zoom lens separately. It reduces the thickness of the zoom lens in the optical axis direction, and the zoom lens exhibits an advantageous structure in its compactness.

In each example, the zoom lens is designed such that negative distortion becomes comparatively great especially at the wide-angle end, but the total lens system becomes much smaller. In order to maintain a quality of an image in this case, it is preferable to electronically correct the distortion.

Lens data of the zoom lens in Examples 1-6 are shown below. The lens data show the following symbols.

f: Focal length of the total systems of the zoom lens

F: F number

ω: Half angle of view

R: Curvature radius d: Lens interval $n_d$: Refractive index at d-line $v_d$: Abbe number 2Y: Diagonal length of an image pickup surface of a solid-state image pickup element (Diagonal length on rectangular effective pixel area of a solid-state image pickup element)

*: Aspheric surface

A form of an aspheric surface is indicated by the following expression (19), where the tip of the surface is on the origin, an X-axis extends along the optical axis direction, and h represents a height in the direction perpendicular to the optical axis.

$$X = \frac{h^2/R}{1 + \sqrt{1 - (1+K)h^2/R^2}} + \sum A_i h^i \quad (19)$$

In the expression, $A_i$ represents $i^{th}$ order aspheric surface coefficient, R represents a curvature radius and K represents a conic constant.

Example 1

Figure 4:
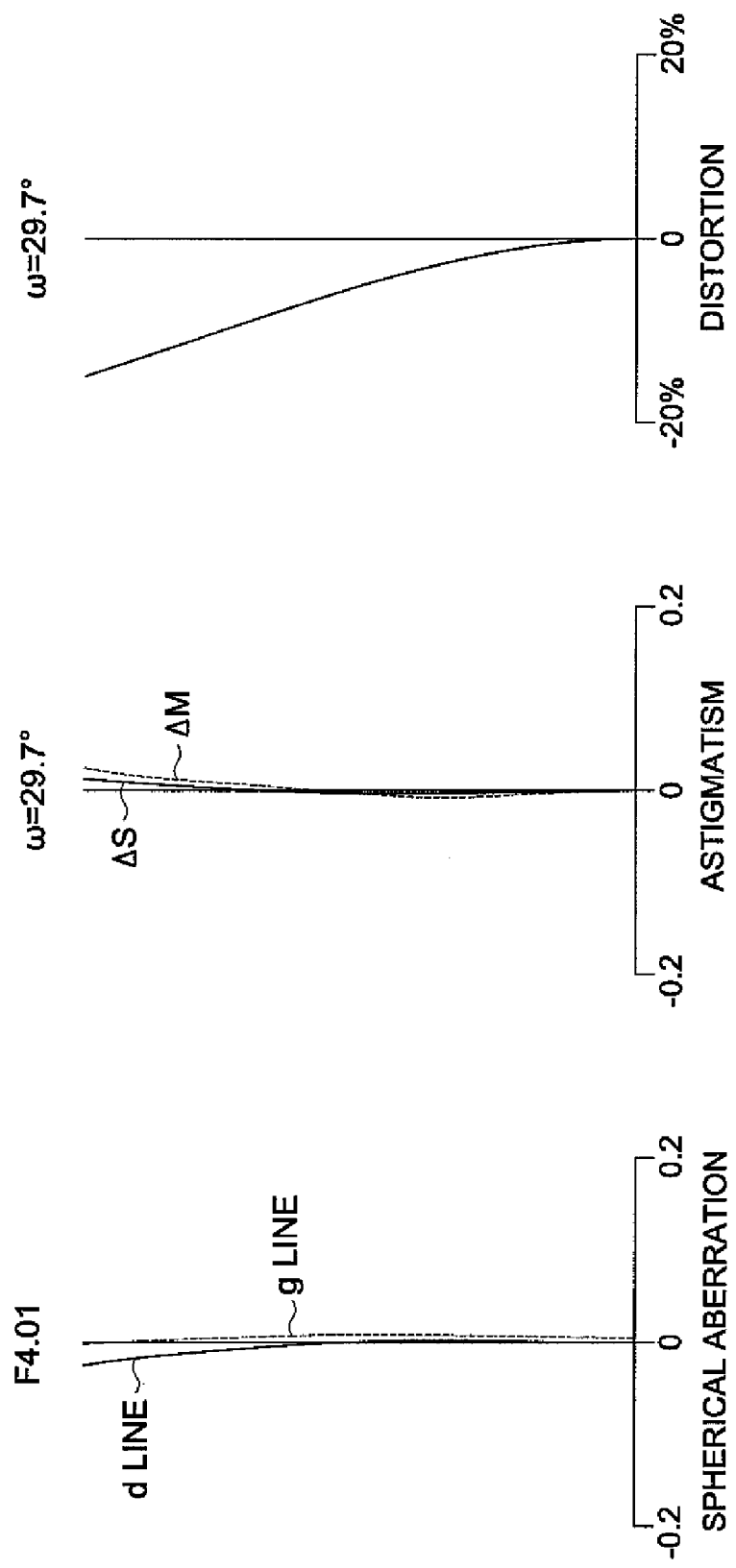
FIG. 4 is a diagram of aberrations at the wide-angle end of Example 1.
Figure 5:
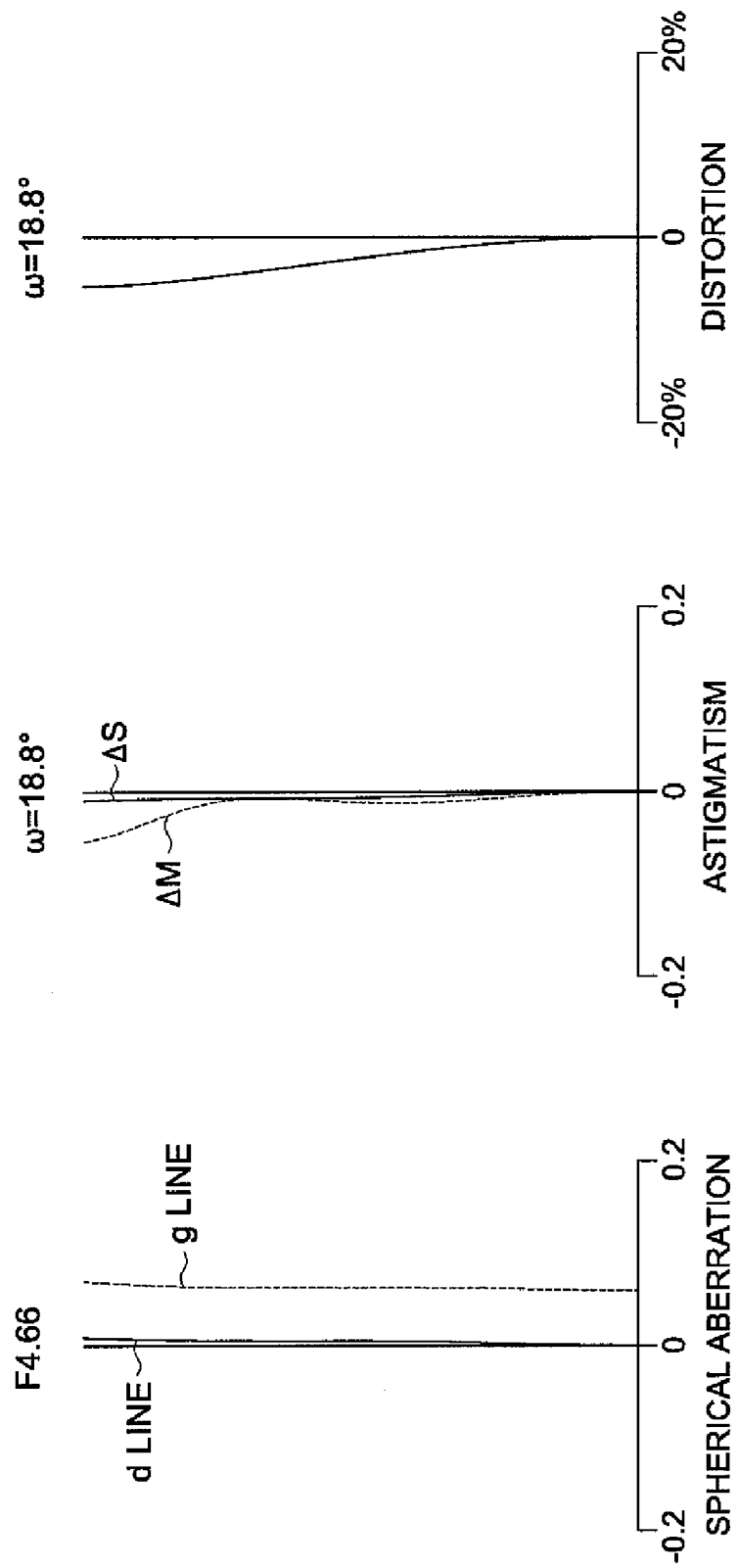
FIG. 5 is a diagram of aberrations at the intermediate focal length of Example 1.
Figure 6:
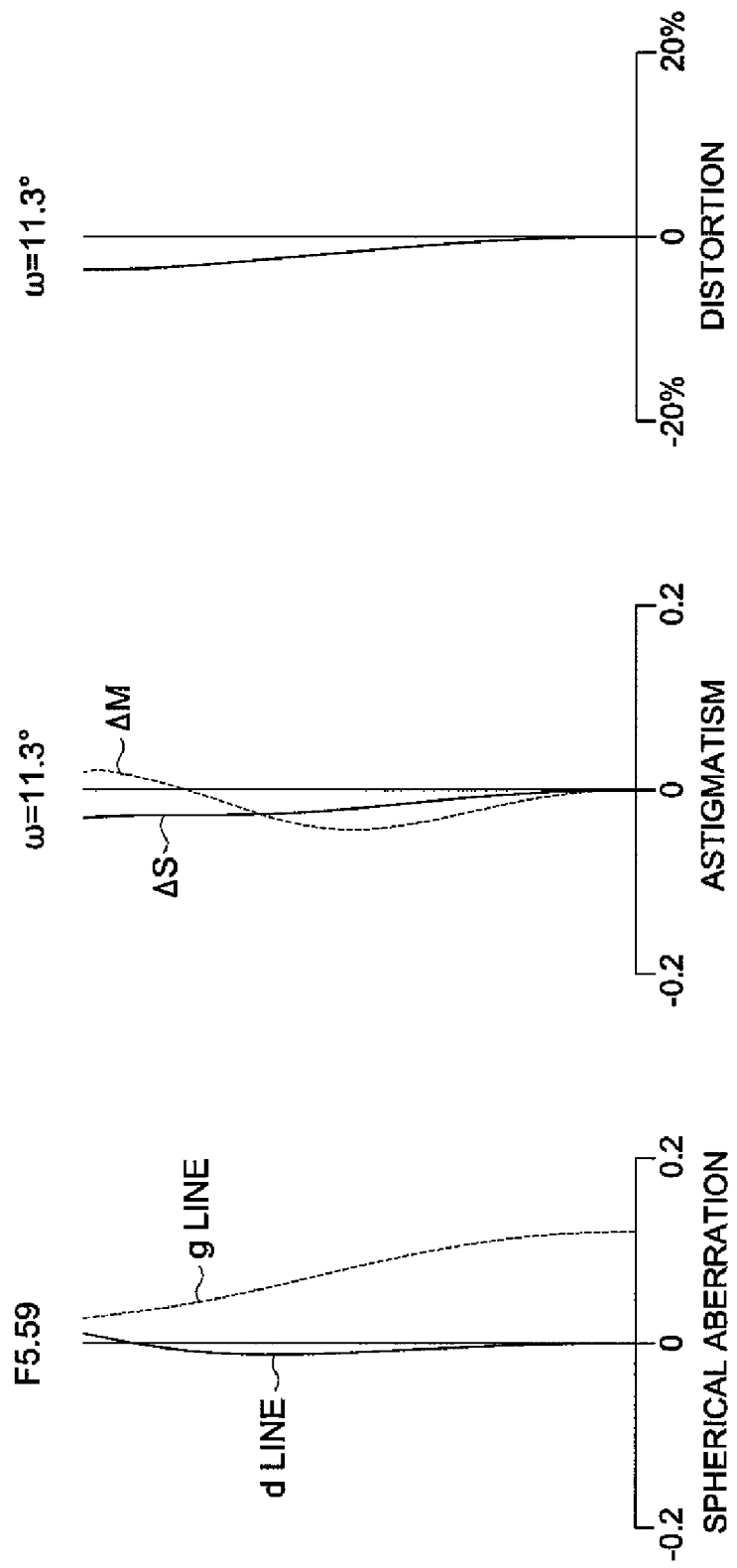
FIG. 6 is a diagram of aberrations at the telephoto end of Example 1.
Figure 7:
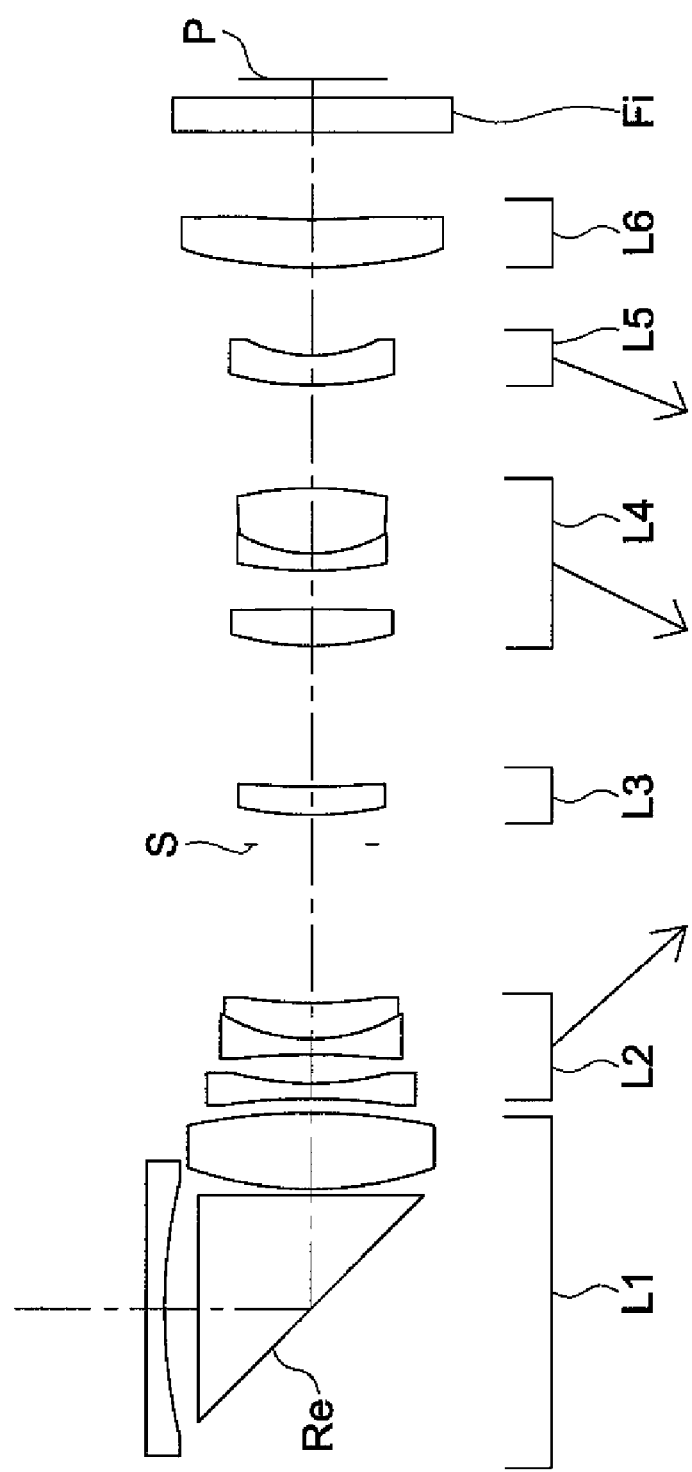
FIG. 7 is a diagram of a lens structure of the wide-angle end of Example 2.

Table 1 shows lens surface data of Example 1. FIG. 4 shows aberration diagrams at the wide-angle end, FIG. 5 shows aberration diagrams at the intermediate focal length, and FIG. 5 shows aberration diagrams at the telephoto end.

In the zoom lens of Example 1, the tenth lens formed by the lens surfaces 20 and 21, and the eleventh lens formed by the surfaces 22 and 23 are plastic lenses. The diagonal length of the image pickup element 2Y is 7.812.

TABLE 1

| Surface No. | R(m) | d(mm) | $n_d$ | $v_d$ |
|---|---|---|---|---|
| 1 | ∞ | 0.60 | 1.94595 | 18.0 |
| 2 | 17.447 | 1.08 | | |
| 3 | ∞ | 7.25 | 1.84666 | 23.8 |
| 4 | ∞ | 0.20 | | |
| 5(*) | 11.178 | 2.49 | 1.80139 | 45.4 |
| 6(*) | −18.709 | d1(Variable) | | |
| 7 | −19.212 | 0.50 | 1.90366 | 31.3 |
| 8 | 9.863 | 0.90 | | |
| 9 | −26.012 | 0.50 | 1.72916 | 54.7 |
| 10 | 5.918 | 1.08 | 1.94595 | 18.0 |
| 11 | 14.138 | d2(Variable) | | |
| 12(Stop) | ∞ | 0.94 | | |
| 13 | 14.860 | 0.90 | 1.80518 | 25.4 |
| 14 | 73.122 | d3(Variable) | | |
| 15(*) | 6.319 | 1.43 | 1.58332 | 59.3 |
| 16(*) | 64.519 | 0.89 | | |
| 17 | 14.673 | 0.55 | 1.90366 | 31.3 |
| 18 | 4.378 | 2.48 | 1.49700 | 81.6 |
| 19 | −8.677 | d4(Variable) | | |
| 20(*) | 14.207 | 0.95 | 1.60700 | 27.0 |
| 21(*) | 5.404 | d5(Variable) | | |
| 22(*) | 9.740 | 1.60 | 1.53048 | 55.7 |
| 23(*) | 11.682 | 1.50 | | |
| 24 | ∞ | 1.20 | 1.51633 | 64.2 |
| 25 | ∞ | | | |

| Aspheric surface coefficient |
|---|
| 5th surface |

K = 0
A4 = −1.70736E−04
A6 = −1.47541E−06
A8 = 1.55312E−07
A10 = −7.62058E−09

6th surface

K = 0
A4 = −2.11701E−06
A6 = 2.69375E−06
A8 = −4.41401E−08
A10 = −3.63105E−09

15th surface

K = 0
A4 = −2.14515E−04
A6 = 3.53922E−05
A8 = −5.45867E−06
A10 = 3.65419E−07

16th surface

K = 0
A4 = 5.43332E−04
A6 = 3.64851E−05
A8 = −6.48052E−06
A10 = 4.59435E−07

20th surface

K = 0
A4 = 8.20665E−04
A6 = −2.33247E−05
A8 = 6.62358E−06
A10 = 2.58481E−07

21st surface

K = 0
A4 = 1.06019E−03
A6 = −1.58835E−05
A8 = −5.54102E−07
A10 = 1.23587E−06

-continued

Aspheric surface coefficient

22nd surface

K = 0
A4 = −1.96443E−03
A6 = 1.98594E−04
A8 = −2.04302E−05
A10 = 9.87164E−07
A12 = −1.45318E−08

23rd surface

K = 0
A4 = −4.11467E−03
A6 = 3.07054E−04
A8 = −2.69047E−05
A10 = 1.21210E−06
A12 = −1.73429E−08

Various Data for Zooming
Zoom ratio: 2.85

|  | Wide-angle end | Intermediate focal length | Telephoto-end |
|---|---|---|---|
| Focal length | 6.84 | 11.50 | 19.52 |
| F number | 4.01 | 4.66 | 5.59 |
| Half angle of view | 29.7 | 18.8 | 11.3 |
| Image height | 3.32 | 3.70 | 3.76 |
| Total length of lens system | 44.27 | 44.25 | 44.27 |
| Back focal length | 4.10 | 4.08 | 4.10 |
| d1 | 0.450 | 2.426 | 4.085 |
| d2 | 5.017 | 3.041 | 1.382 |
| d3 | 4.485 | 2.599 | 0.500 |
| d4 | 3.269 | 3.435 | 3.000 |
| d5 | 2.619 | 4.339 | 6.873 |

Lens Group Data

| Group | Starting surface | Focal length |
|---|---|---|
| 1 | 1 | 11.06 |
| 2 | 7 | −4.71 |
| 3 | 13 | 23.00 |
| 4 | 15 | 9.86 |
| 5 | 20 | −14.98 |
| 6 | 22 | 85.92 |

Movement Amount of Focal Point Due to Temperature Change in Plastic Lenses

|  | Wide-angle end | Intermediate focal length | Telephoto-end |
|---|---|---|---|
| f | 6.84 | 11.50 | 19.52 |
| Movement amount of focal point | −0.027 | −0.039 | −0.061 |

Example 2

Figure 8:
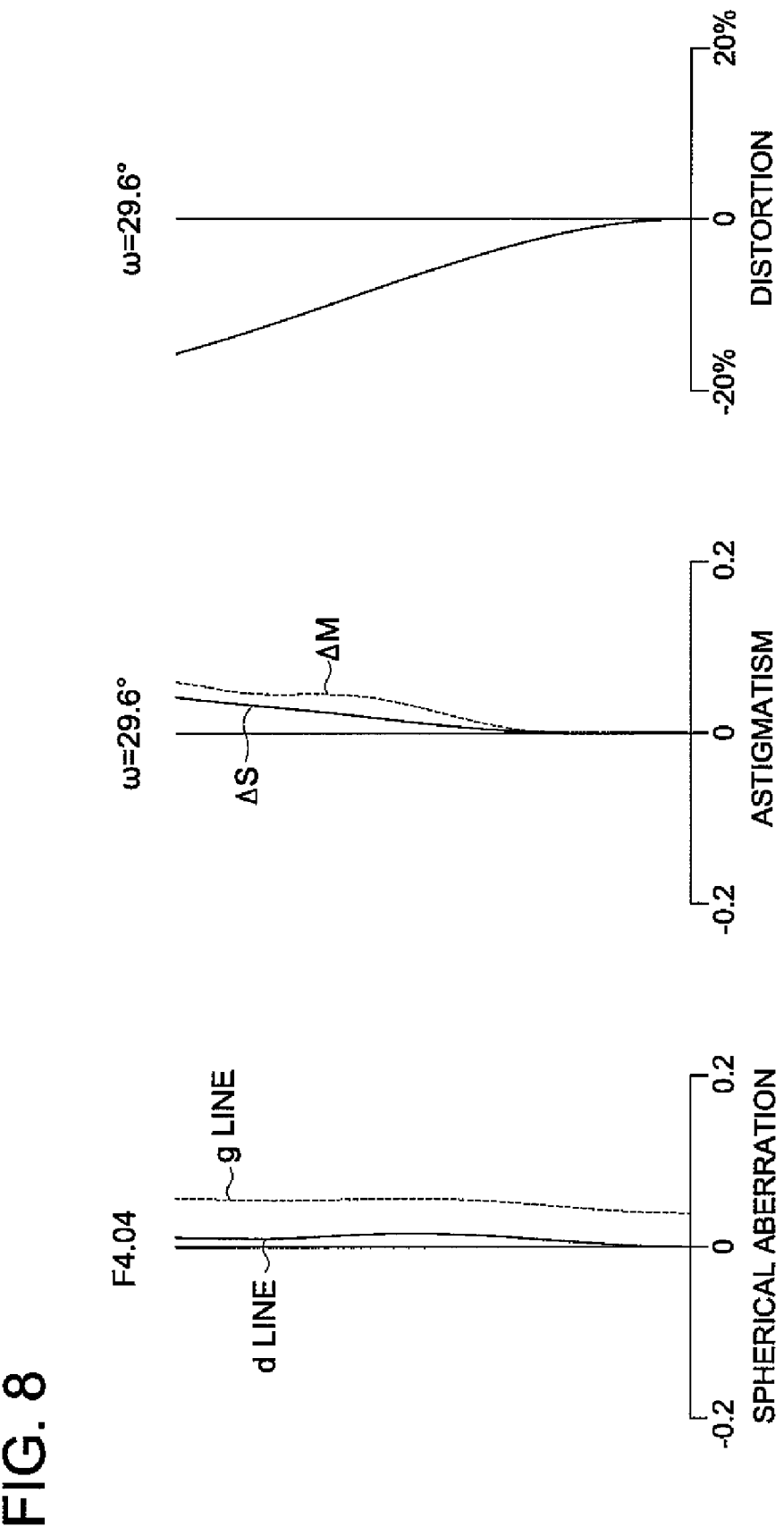
FIG. 8 is a diagram of aberrations at the wide-angle end of Example 2.
Figure 9:
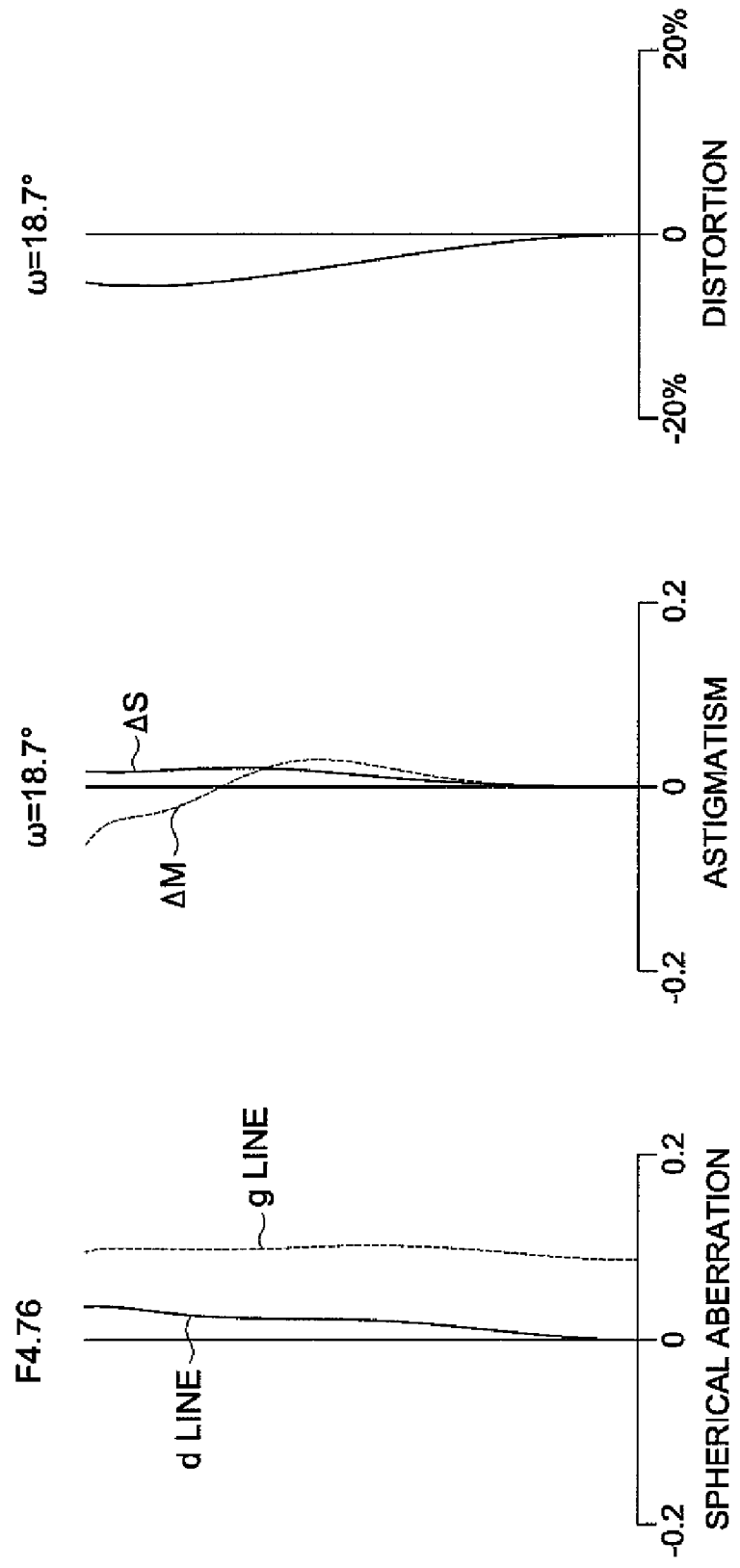
FIG. 9 is a diagram of aberrations at the intermediate focal length of Example 2.
Figure 10:
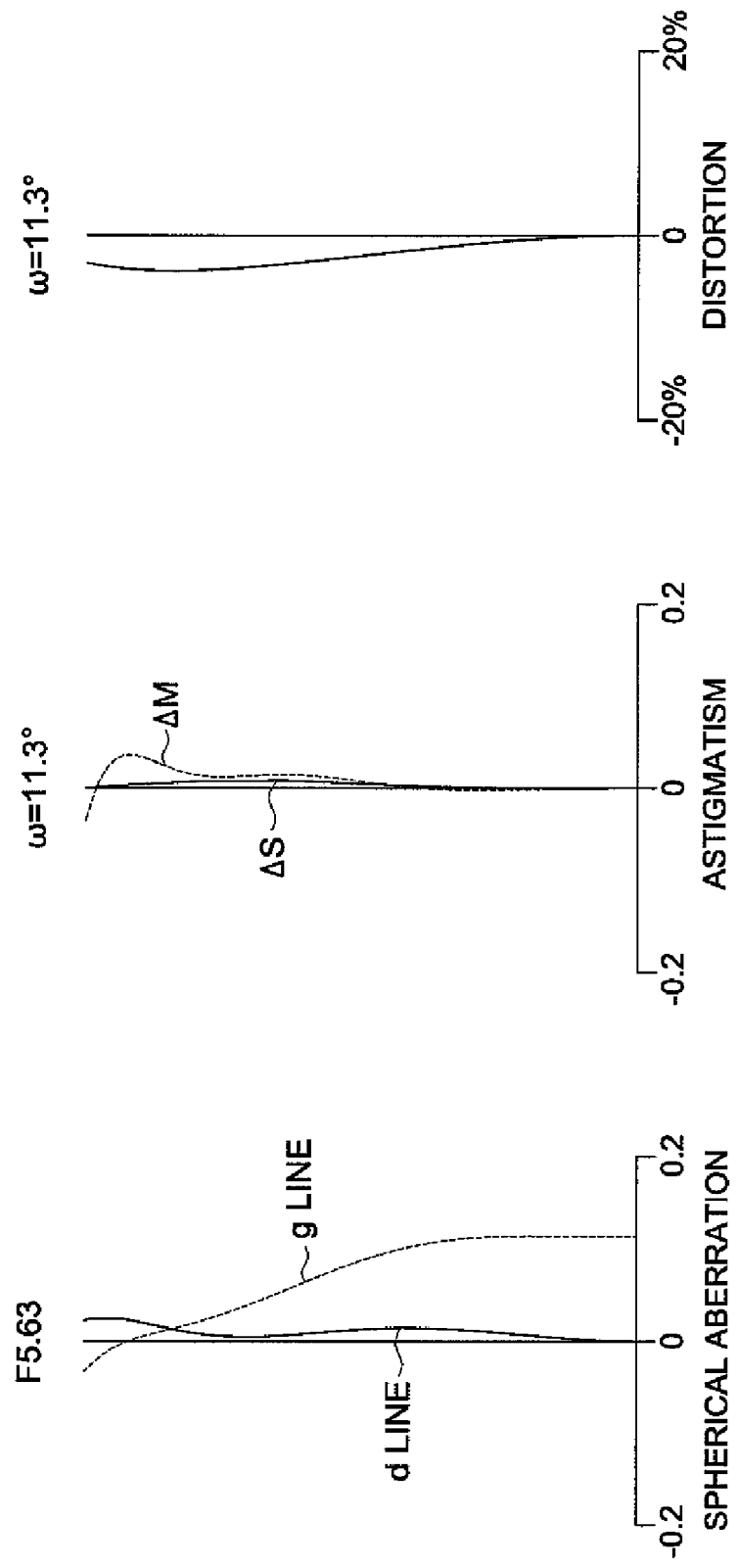
FIG. 10 is a diagram of aberrations at the telephoto end of Example 2.
Figure 11:
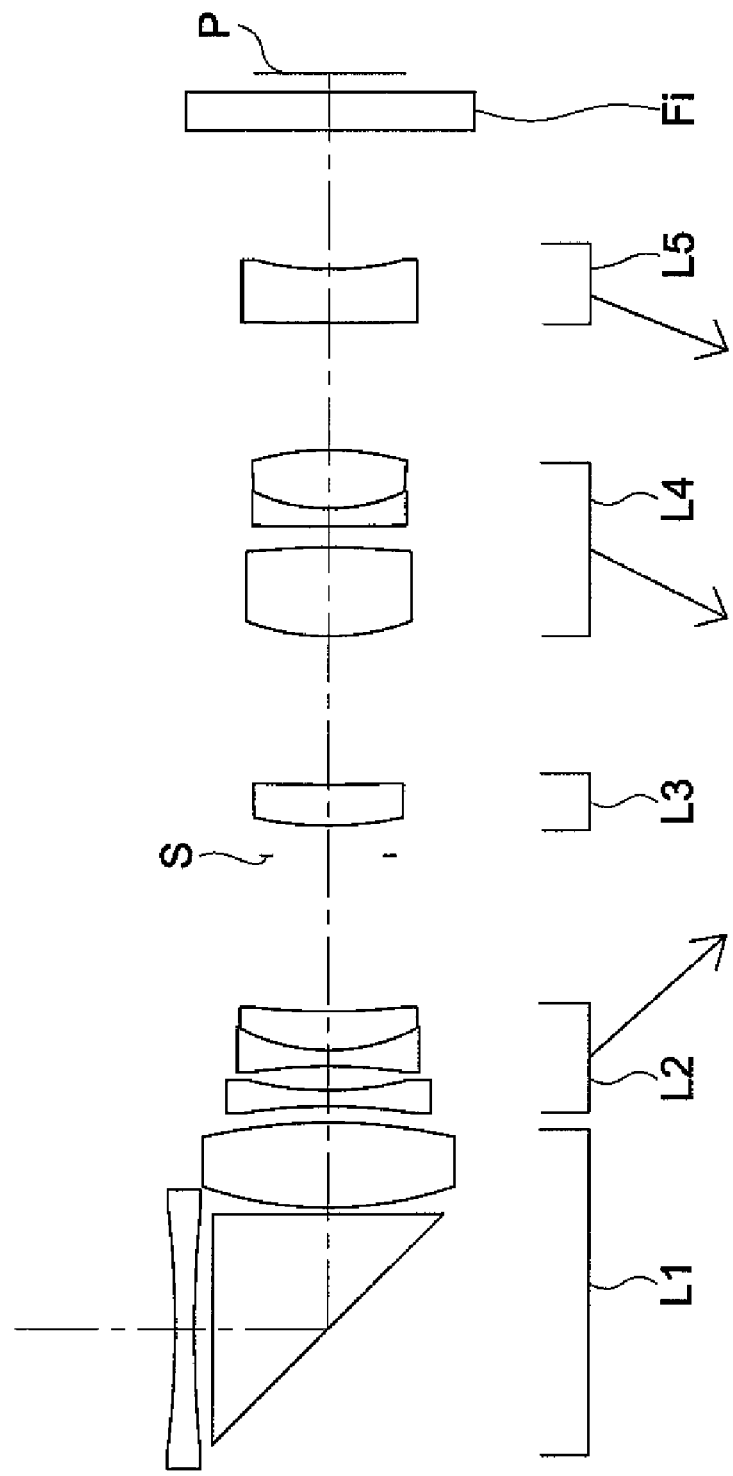
FIG. 11 is a diagram of a lens structure of the wide-angle end of Example 3.

Table 2 shows lens surface data of Example 2. FIG. 8 shows aberration diagrams at the wide-angle end, FIG. 9 shows aberration diagrams at the intermediate focal length, and FIG. 10 shows aberration diagrams at the telephoto end.

In the zoom lens of Exampled 2, the tenth lens formed by the lens surfaces 20 and 21, and the eleventh lens formed by the surfaces 22 and 23 are plastic lenses. The diagonal length of the image pickup element 2Y is 7.812.

TABLE 2

| Surface No. | R(m) | d(mm) | $n_d$ | $v_d$ |
|---|---|---|---|---|
| 1 | ∞ | 0.60 | 1.94595 | 18.0 |
| 2 | 17.450 | 1.08 |  |  |
| 3 | ∞ | 7.24 | 1.84666 | 23.8 |
| 4 | ∞ | 0.20 |  |  |
| 5(*) | 11.212 | 2.45 | 1.80139 | 45.4 |
| 6(*) | −19.301 | d1(Variable) |  |  |
| 7 | −19.930 | 0.50 | 1.90366 | 31.3 |
| 8 | 9.774 | 0.92 |  |  |
| 9 | −24.206 | 0.50 | 1.72916 | 54.7 |
| 10 | 5.522 | 1.16 | 1.94595 | 18.0 |
| 11 | 14.450 | d2(Variable) |  |  |
| 12(Stop) | ∞ | 0.94 |  |  |
| 13(*) | 10.943 | 0.90 | 1.80892 | 40.5 |
| 14 | 25.943 | d3(Variable) |  |  |
| 15(*) | 8.620 | 1.18 | 1.58313 | 59.4 |
| 16 | −95.693 | 1.24 |  |  |
| 17 | 12.190 | 0.55 | 1.90366 | 31.3 |
| 18 | 4.705 | 2.10 | 1.49700 | 81.6 |
| 19 | −10.199 | d4(Variable) |  |  |
| 20(*) | 10.665 | 0.95 | 1.60700 | 27.0 |
| 21(*) | 4.834 | d5(Variable) |  |  |
| 22(*) | 10.946 | 1.54 | 1.53048 | 55.7 |
| 23(*) | 12.692 | 2.82 |  |  |
| 24 | ∞ | 1.10 | 1.51633 | 64.2 |
| 25 | ∞ |  |  |  |

Aspheric surface coefficient

5th surface

K = 0
A4 = −1.79454E−04
A6 = −4.53630E−06
A8 = 5.85513E−07
A10 = −2.46516E−08
A12 = 4.01958E−10

6th surface

K = 0
A4 = −6.34659E−06
A6 = −5.68418E−06
A8 = 1.19784E−06
A10 = −6.70188E−08
A12 = 1.34680E−09

13th surface

K = 0
A4 = −1.59570E−04
A6 = 3.28915E−05
A8 = −1.19704E−05
A10 = 1.29497E−06

15th surface

K = 0
A4 = −4.29528E−04
A6 = −5.87287E−06
A8 = 3.90181E−06
A10 = −4.27847E−07

20th surface

K = 0
A4 = 3.45535E−04
A6 = 7.80149E−05
A8 = −1.23397E−05
A10 = 1.51306E−06

-continued

Aspheric surface coefficient

21st surface

K = 0
A4 = 3.38841E−04
A6 = 1.19397E−04
A8 = −2.88552E−05
A10 = 3.14864E−06

22nd surface

K = 0
A4 = −2.98757E−03
A6 = 2.95357E−04
A8 = −2.68969E−05
A10 = 1.63830E−06
A12 = −3.59111E−08

23rd surface

K = 0
A4 = −5.68030E−03
A6 = 4.81696E−04
A8 = −4.11415E−05
A10 = 2.32371E−06
A12 = −4.76451E−08

Various Data for Zooming
Zoom ratio: 2.85

|  | Wide-angle end | Intermediate focal length | Telephoto-end |
|---|---|---|---|
| Focal length | 6.87 | 11.54 | 19.57 |
| F number | 4.04 | 4.76 | 5.63 |
| Half angle of view | 29.6 | 18.7 | 11.3 |
| Image height | 3.32 | 3.70 | 3.78 |
| Total length of lens system | 44.30 | 44.28 | 44.30 |
| Back focal length | 4.12 | 4.10 | 4.12 |
| d1 | 0.450 | 2.385 | 4.141 |
| d2 | 5.070 | 3.135 | 1.379 |
| d3 | 4.512 | 2.463 | 0.500 |
| d4 | 3.282 | 3.333 | 3.018 |
| d5 | 2.809 | 4.807 | 7.085 |

Lens Group Data

| Group | Starting surface | Focal length |
|---|---|---|
| 1 | 1 | 11.30 |
| 2 | 7 | −4.78 |
| 3 | 13 | 22.79 |
| 4 | 15 | 9.84 |
| 5 | 20 | −15.52 |
| 6 | 22 | 114.92 |

Movement Amount of Focal Point Due to Temperature Change in Plastic Lenses

|  | Wide angle end | Intermediate focal length | Telephoto-end |
|---|---|---|---|
| f | 6.87 | 11.54 | 19.57 |
| Movement amount of focal point | 0.005 | −0.012 | −0.033 |

Example 3

Figure 12:
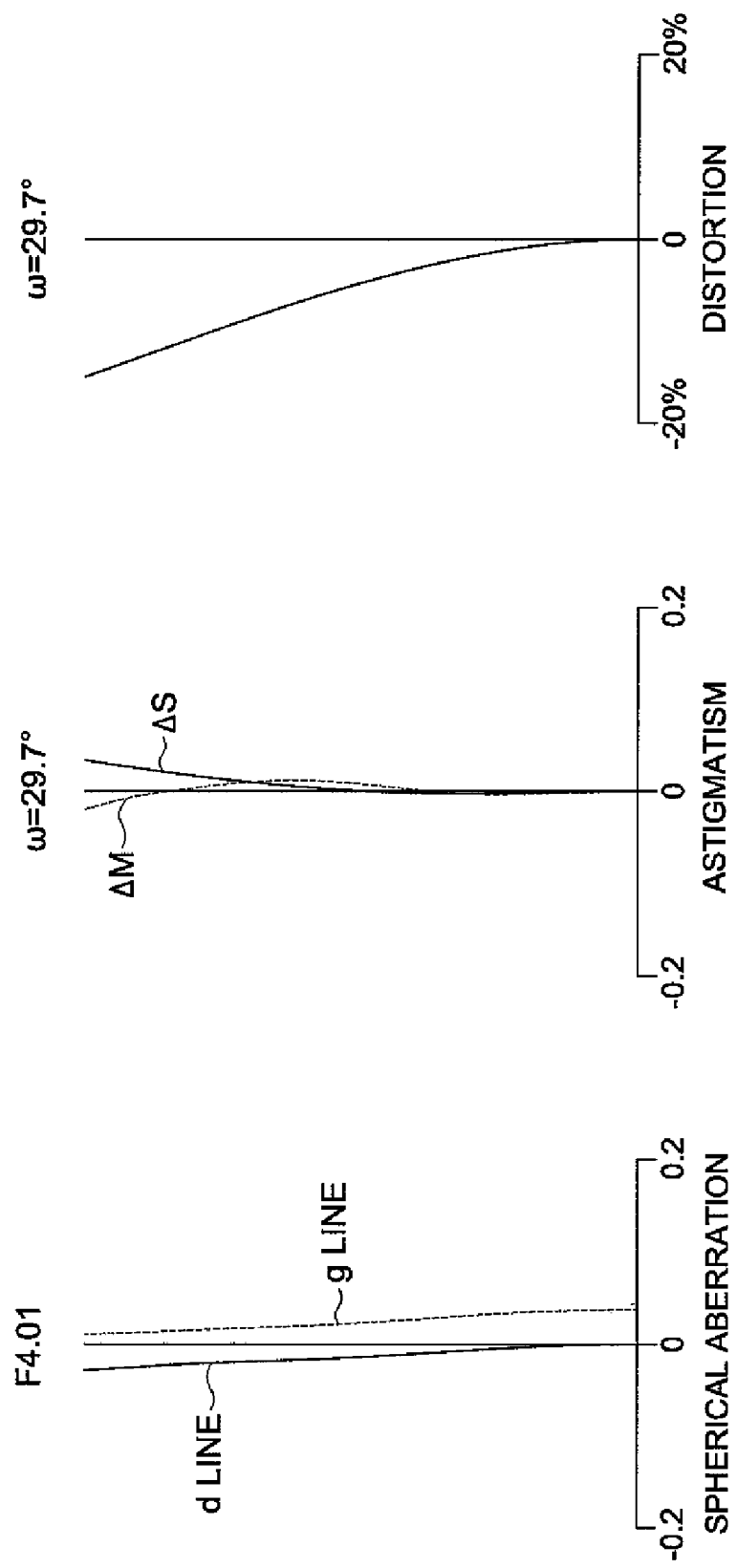
FIG. 12 is a diagram of aberrations at the wide-angle end of Example 3.
Figure 13:
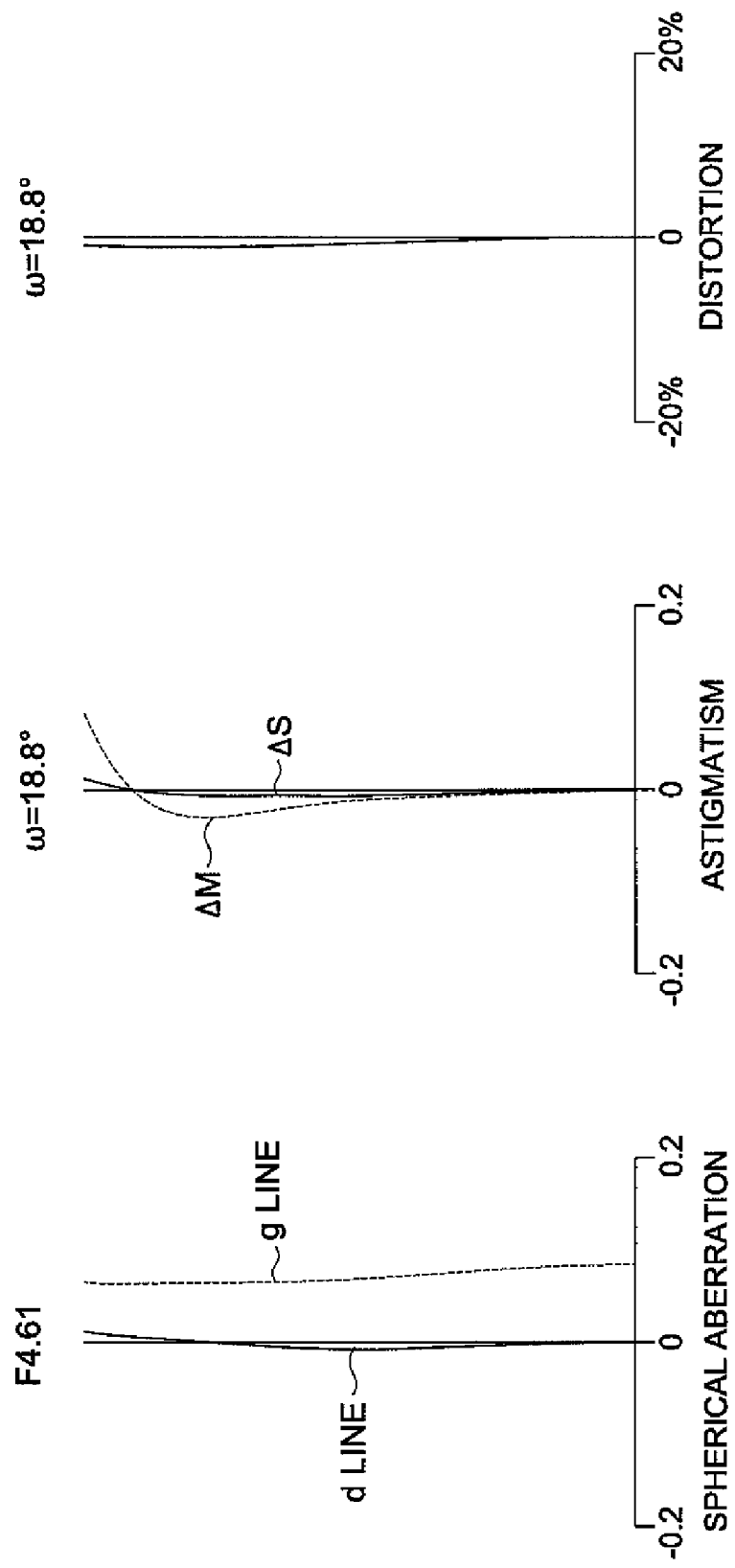
FIG. 13 is a diagram of aberrations at the intermediate focal length of Example 3.
Figure 14:
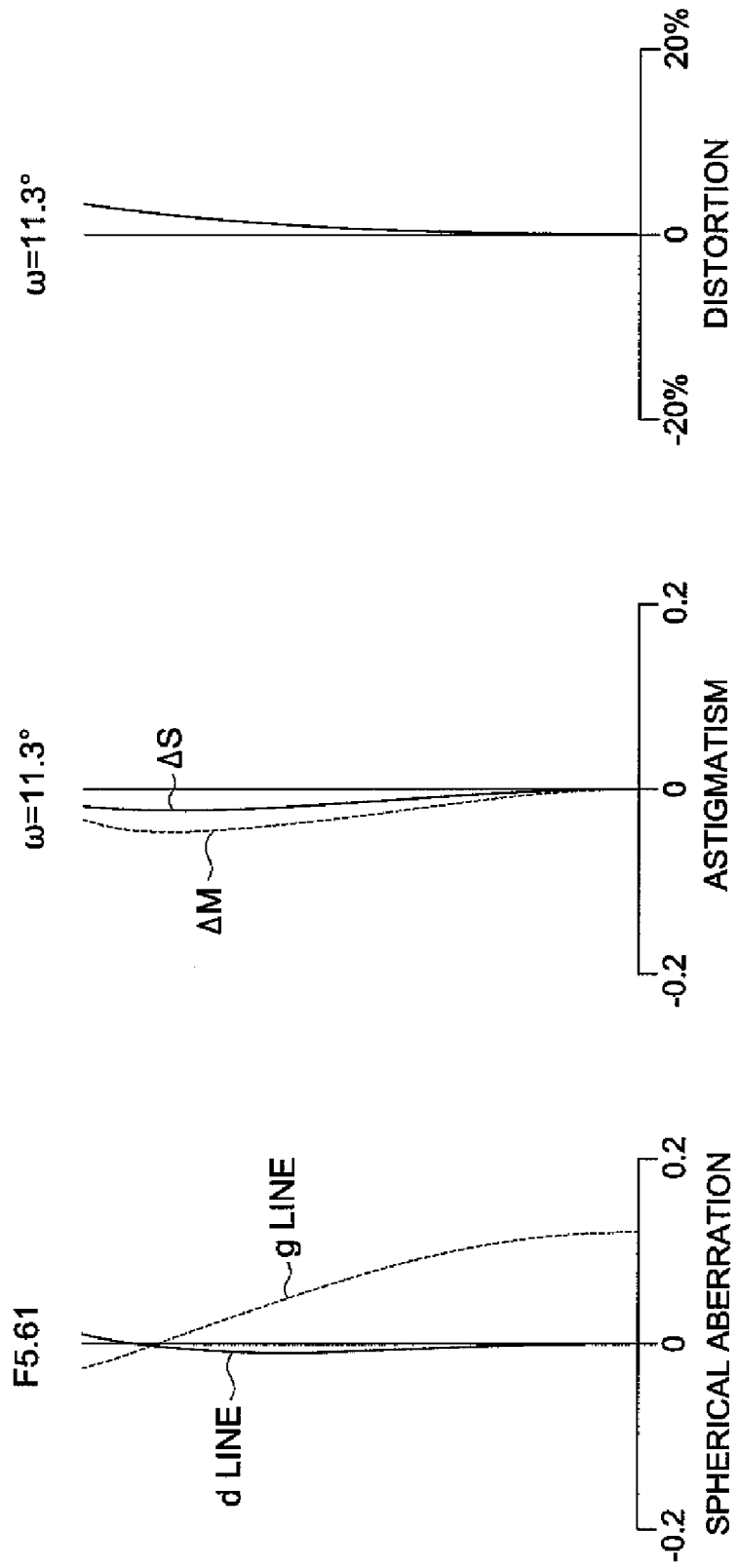
FIG. 14 is a diagram of aberrations at the telephoto end of Example 3.
Figure 15:
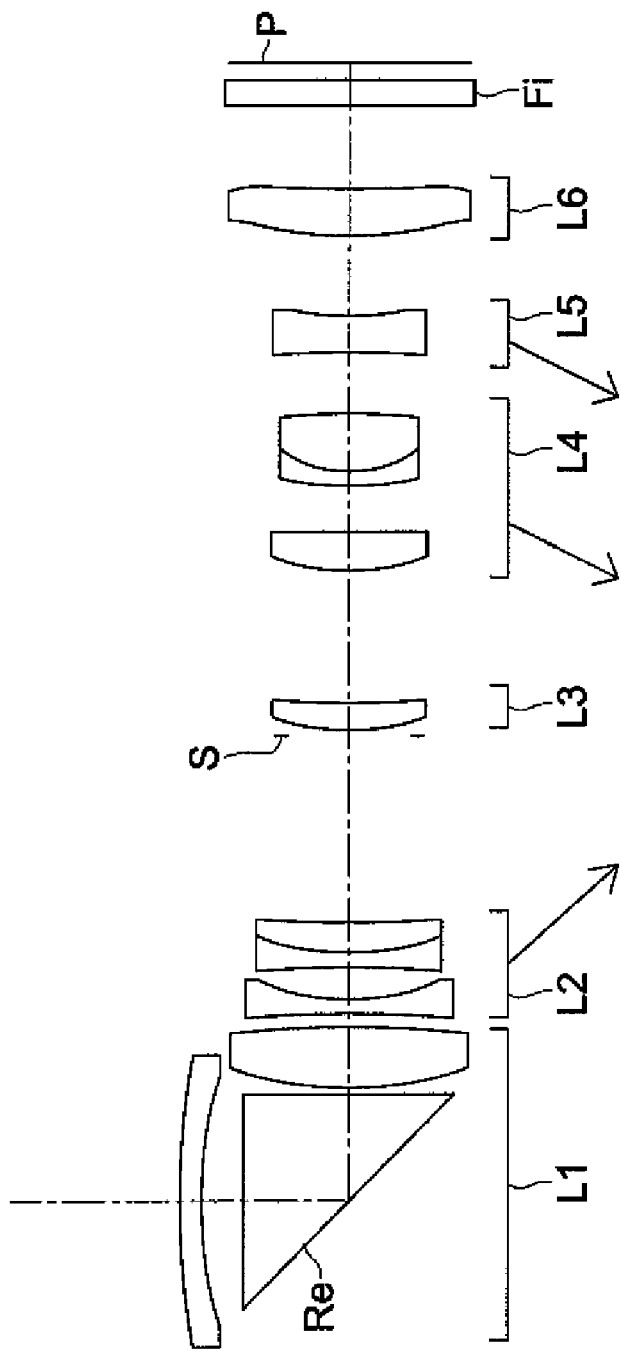
FIG. 15 is a diagram of a lens structure of the wide-angle end of Example 4.

Table 3 shows lens surface data of Example 3. FIG. 12 shows aberration diagrams at the wide-angle end, FIG. 13 shows aberration diagrams at the intermediate focal length, and FIG. 14 shows aberration diagrams at the telephoto end.

In the zoom lens in Example 3, the tenth lens formed by the lens surfaces 20 and 21 is a plastic lens. The diagonal length of the image pickup element 2Y is 7.812.

TABLE 3

| Surface No. | R(m) | d(mm) | $n_d$ | $v_d$ |
|---|---|---|---|---|
| 1 | −31.051 | 0.60 | 1.94595 | 18.0 |
| 2 | 38.191 | 0.57 |  |  |
| 3 | ∞ | 7.25 | 1.84666 | 23.8 |
| 4 | ∞ | 0.20 |  |  |
| 5(*) | 11.772 | 2.68 | 1.80139 | 45.4 |
| 6(*) | −15.869 | d1(Variable) |  |  |
| 7 | −17.080 | 0.50 | 1.90366 | 31.3 |
| 8 | 9.873 | 0.75 |  |  |
| 9 | −16.080 | 0.50 | 1.72916 | 54.7 |
| 10 | 5.890 | 1.21 | 1.94595 | 18.0 |
| 11 | 19.710 | d2(Variable) |  |  |
| 12(Stop) | ∞ | 0.94 |  |  |
| 13(*) | 12.112 | 1.28 | 1.69350 | 53.2 |
| 14(*) | 103.878 | d3(Variable) |  |  |
| 15(*) | 7.244 | 2.79 | 1.58332 | 59.3 |
| 16(*) | −20.372 | 0.66 |  |  |
| 17 | 153.686 | 0.55 | 1.90366 | 31.3 |
| 18 | 5.506 | 1.85 | 1.49700 | 81.6 |
| 19 | −8.596 | d4(Variable) |  |  |
| 20(*) | −143.316 | 1.67 | 1.53048 | 55.7 |
| 21(*) | 11.262 | d5(Variable) |  |  |
| 22 | ∞ | 1.20 | 1.51633 | 64.2 |
| 23 | ∞ |  |  |  |

Aspheric surface coefficient

5th surface

K = 0
A4 = −9.60158E−05
A6 = 1.72395E−06
A8 = −1.13804E−07
A10 = 2.01990E−09

6th surface

K = 0
A4 = 1.61581E−04
A6 = 2.84909E−06
A8 = −2.22540E−07
A10 = 4.75485E−09

13th surface

K = 0
A4 = 7.78907E−04
A6 = −3.78182E−05
A8 = 1.78935E−05
A10 = −1.64883E−06

14th surface

K = 0
A4 = 9.68317E−04
A6 = −5.32543E−05
A8 = 2.27607E−05
A10 = −1.86224E−06

15th surface

K = 0
A4 = −2.62866E−04
A6 = −5.04618E−06

-continued

Aspheric surface coefficient

A8 = −1.28224E−07
A10 = 1.55000E−07
16th surface

K = 0
A4 = 4.24610E−04
A6 = 4.38495E−05
A8 = −1.32002E−05
A10 = 1.35719E−06
20th surface K = 0
A4 = 9.97729E−04
A6 = 1.43661E−04
A8 = −2.00891E−05
A10 = 1.70862E−06
21st surface

K = 0
A4 = 1.18287E−03
A6 = 1.84810E−04
A8 = −2.59074E−05
A10 = 2.48461E−06

Various Data for Zooming
Zoom ratio: 2.85

|  | Wide-angle end | Intermediate focal length | Telephoto-end |
|---|---|---|---|
| Focal length | 6.84 | 11.50 | 19.52 |
| F number | 4.01 | 4.61 | 5.61 |
| Half angle of view | 29.7 | 18.8 | 11.3 |
| Image height | 3.32 | 3.87 | 4.03 |
| Total length of lens system | 43.83 | 43.83 | 43.83 |
| Back focal length | 5.75 | 7.92 | 11.89 |
| d1 | 0.500 | 2.484 | 4.035 |
| d2 | 4.931 | 2.947 | 1.397 |
| d3 | 4.640 | 2.894 | 0.500 |
| d4 | 4.003 | 3.580 | 2.000 |
| d5 | 4.356 | 6.525 | 10.500 |

Lens Group Data

| Group | Starting surface | Focal length |
|---|---|---|
| 1 | 1 | 10.78 |
| 2 | 7 | −4.66 |
| 3 | 13 | 19.66 |
| 4 | 15 | 10.67 |
| 5 | 20 | −19.61 |

Movement Amount of Focal Point Due to Temperature Change in Plastic Lenses

|  | Wide-angle end | Intermediate focal length | Telephoto-end |
|---|---|---|---|
| f | 6.84 | 11.50 | 19.52 |
| Movement amount of focal point | −0.015 | −0.025 | −0.051 |

Example 4

Figure 16:
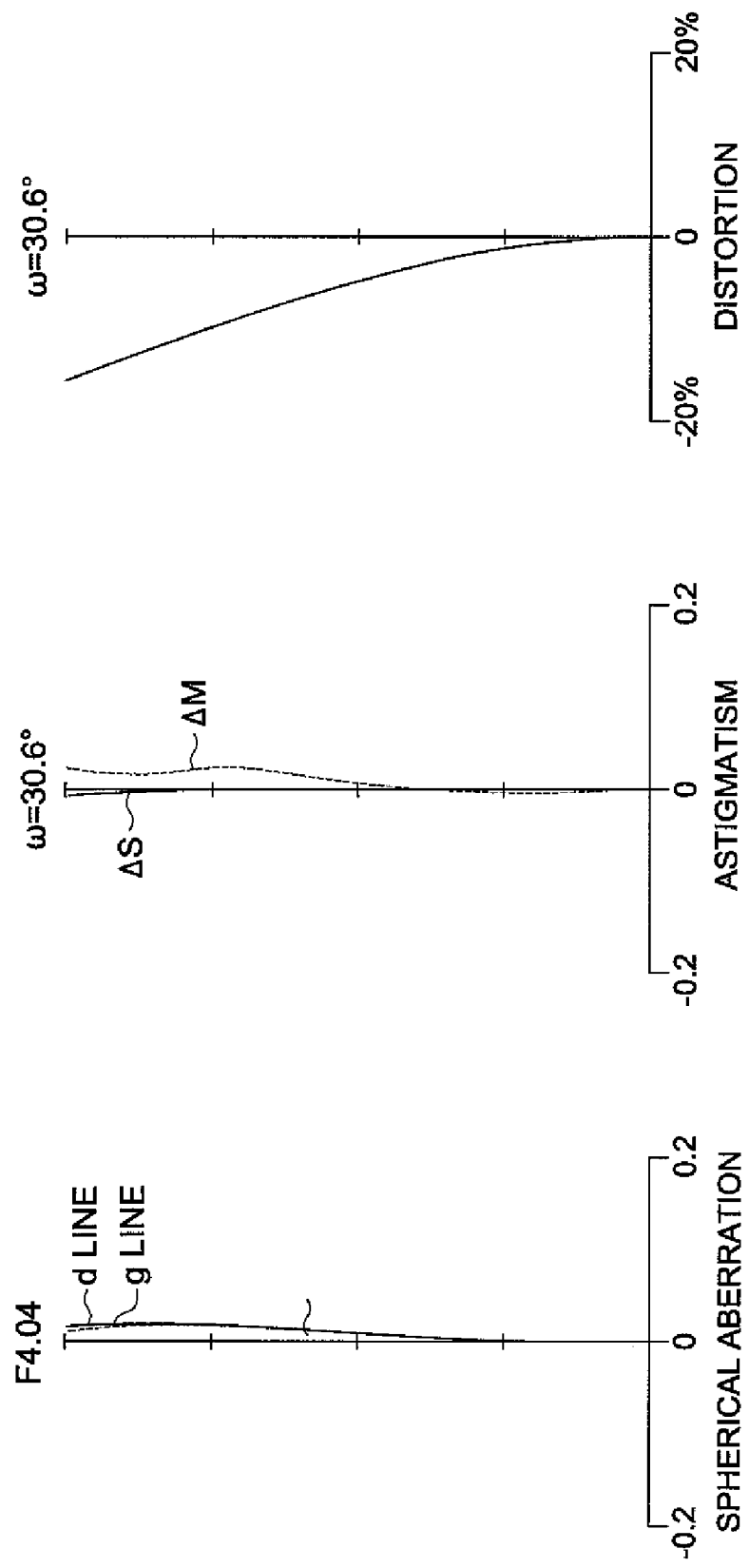
FIG. 16 is a diagram of aberrations the a wide-angle end of Example 4.
Figure 17:
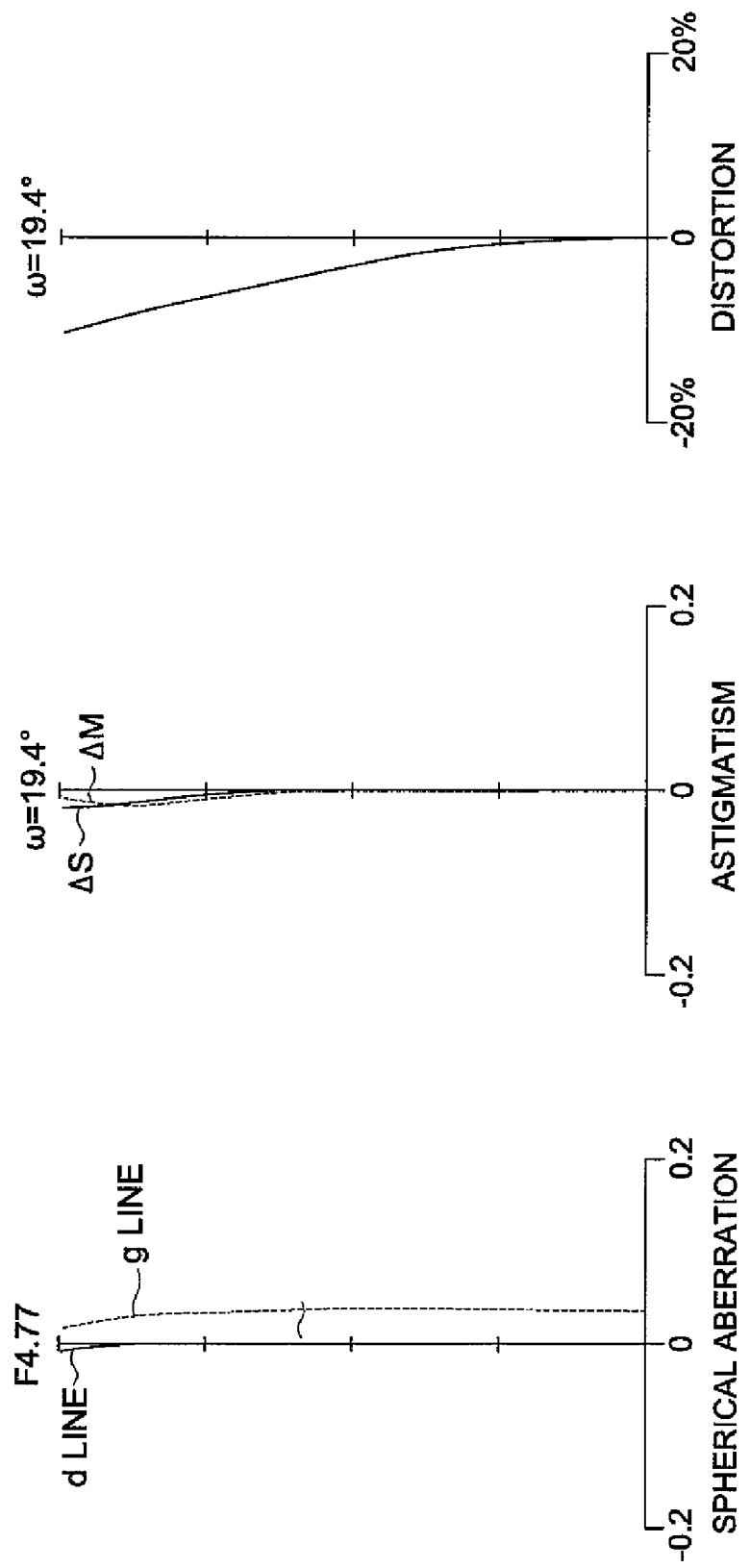
FIG. 17 is a diagram of aberrations at the intermediate focal length of Example 4.
Figure 18:
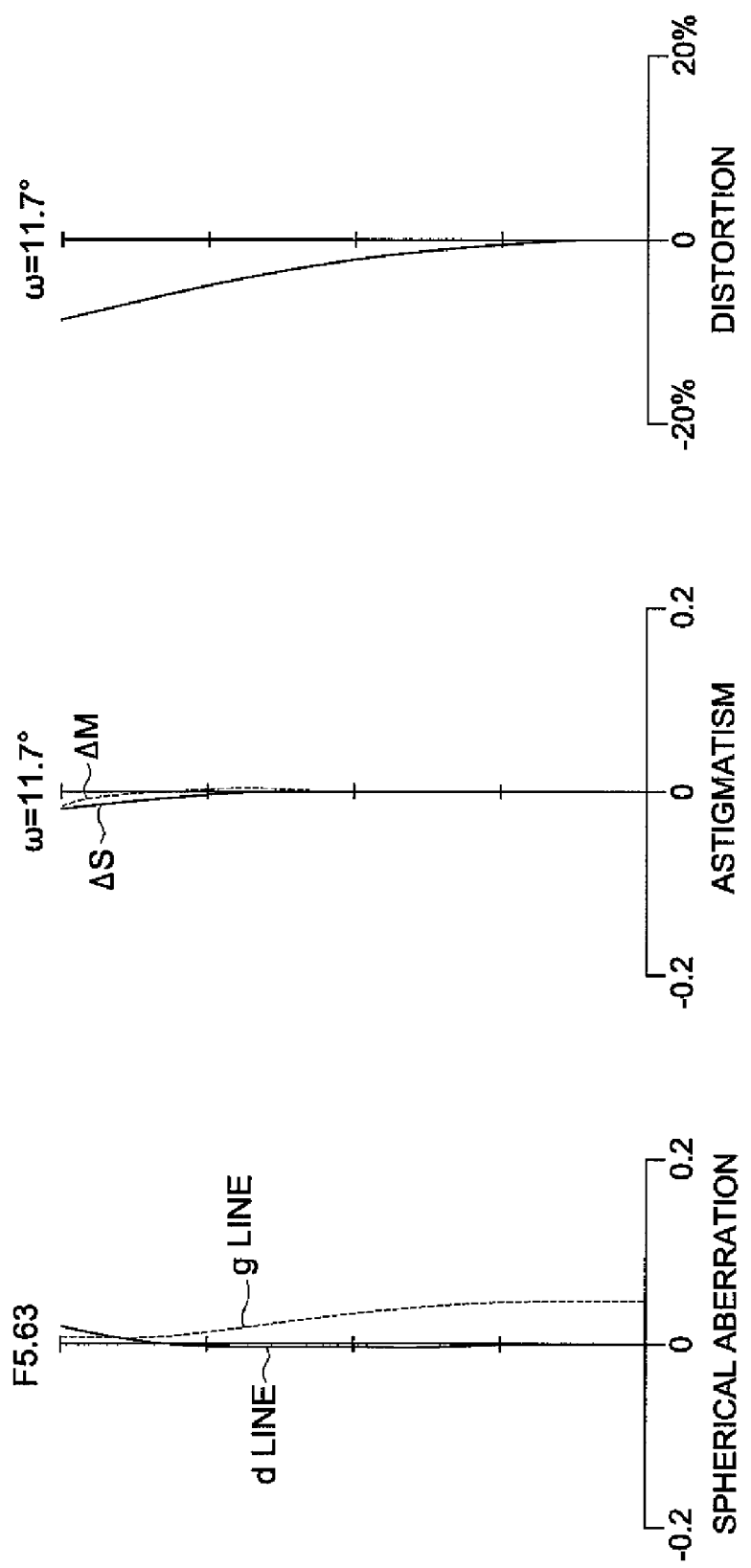
FIG. 18 is a diagram of aberrations at the telephoto end of Example 4.
Figure 19:
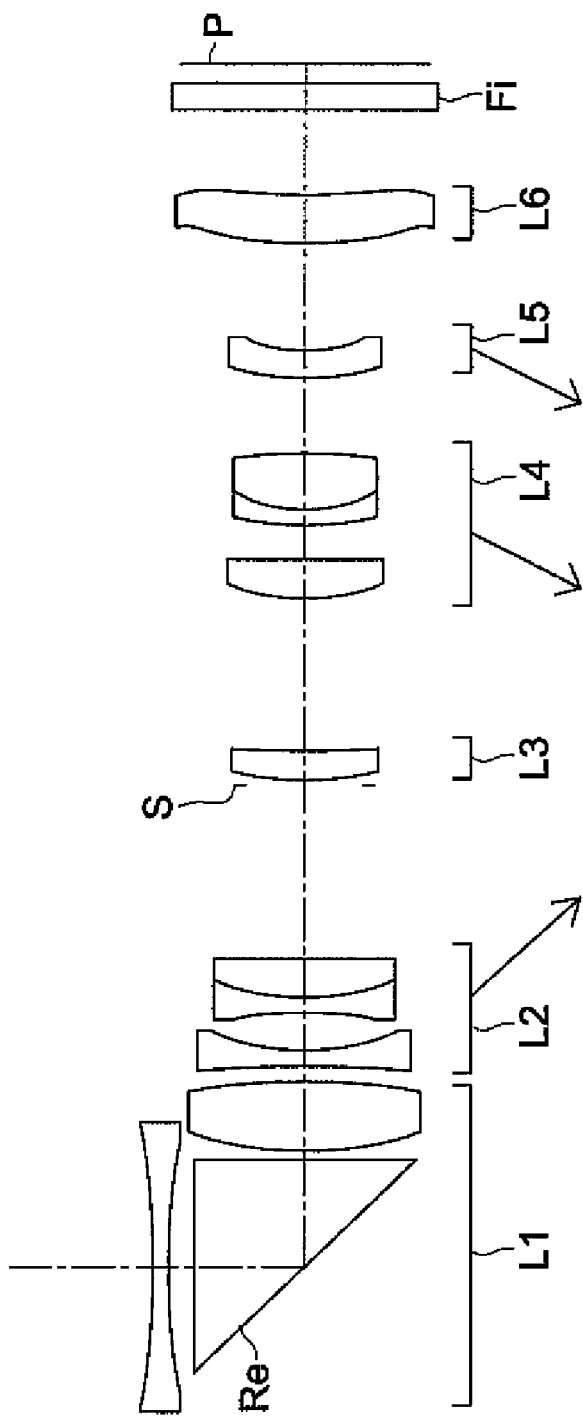
FIG. 19 is a diagram of a lens structure of the wide-angle end of Example 5.

Table 4 shows lens surface data of Example 4. FIG. 16 shows aberration diagrams at the wide-angle end, FIG. 17 shows aberration diagrams at the mid-focal length, and FIG. 18 shows aberration diagrams at the telephoto end.

In the zoom lens in Example 4, the tenth lens formed by the lens surfaces 20 and 21, and the eleventh lens formed by the surfaces 22 and 23 are plastic lenses. The diagonal length of the image pickup element 2Y is 7.812.

TABLE 4

| Surface No. | R (m) | d (mm) | $n_d$ | $v_d$ |
|---|---|---|---|---|
| 1 | 45.294 | 0.60 | 2.14350 | 17.8 |
| 2 | 14.737 | 1.38 |  |  |
| 3 | ∞ | 7.24 | 1.84666 | 23.8 |
| 4 | ∞ | 0.20 |  |  |
| 5 (*) | 11.730 | 2.12 | 1.80139 | 45.4 |
| 6 (*) | −40.551 | d1 (Variable) |  |  |
| 7 | −37.715 | 0.50 | 1.90366 | 31.3 |
| 8 | 7.535 | 1.13 |  |  |
| 9 | −24.873 | 0.50 | 1.72916 | 54.7 |
| 10 | 9.249 | 1.00 | 2.14350 | 17.8 |
| 11 | 32.789 | d2 (Variable) |  |  |
| 12 (Stop) | ∞ | 0.20 |  |  |
| 13 (*) | 8.805 | 0.90 | 1.80892 | 40.5 |
| 14 | 16.182 | d3 (Variable) |  |  |
| 15 (*) | 6.932 | 1.29 | 1.58313 | 59.4 |
| 16 | 2909.424 | 1.65 |  |  |
| 17 | 9.206 | 0.51 | 1.90366 | 31.3 |
| 18 | 3.827 | 2.00 | 1.49700 | 81.6 |
| 19 | −15.871 | d4 (Variable) |  |  |
| 20 (*) | −123.033 | 1.23 | 1.60700 | 27.0 |
| 21 (*) | 9.107 | d5 (Variable) |  |  |
| 22 (*) | 13.630 | 1.59 | 1.53048 | 55.7 |
| 23 (*) | 16.844 | 2.93 |  |  |
| 24 | ∞ | 0.84 | 1.51633 | 64.2 |
| 25 | ∞ |  |  |  |

Aspheric surface coefficient

5th surface

K = 0
A4 = −1.08007E−04
A6 = −5.87970E−06
A8 = 5.77649E−07
A10 = −2.94665E−08
A12 = 3.70983E−10
6th surface K = 0
A4 = −3.56499E−05
A6 = −6.87056E−06
A8 = 9.18136E−07
A10 = −5.49404E−08
A12 = 9.83355E−10
13th surface K = 0
A4 = −1.82051E−04
A6 = −2.67038E−06
A8 = 4.23975E−07
A10 = −6.60600E−08
15th surface

K = 0
A4 = −2.49413E−04
A6 = 4.70675E−07
A8 = −4.82434E−07
A10 = 6.48394E−08

-continued

Aspheric surface coefficient

20th surface

K = 0
A4 = −1.59508E−03
A6 = 1.78728E−05
A8 = −5.53224E−06
A10 = 1.77901E−06
21st surface K = 0
A4 = −7.20235E−04
A6 = 5.98285E−05
A8 = −1.60392E−05
A10 = 1.92352E−06
22nd surface K = 0
A4 = −1.57926E−03
A6 = 3.74602E−04
A8 = −3.42983E−05
A10 = 1.77168E−06
A12 = −4.76967E−08
23rd surface K = 0
A4 = −4.23329E−03
A6 = 4.63625E−04
A8 = −3.61759E−05
A10 = 1.68228E−06
A12 = −4.32667E−08

Various Data for Zooming
Zoom ratio: 2.85

|  | Wide-angle end | Intermediate focal length | Telephoto-end |
|---|---|---|---|
| Focal length | 6.87 | 11.50 | 19.57 |
| F number | 4.04 | 4.77 | 5.63 |
| Half angle of view | 30.6 | 19.4 | 11.7 |
| Image height | 3.41 | 3.62 | 3.68 |
| Total length of lens system | 44.40 | 44.40 | 44.40 |
| Back focal length | 4.07 | 4.08 | 4.08 |
| d1 | 0.450 | 3.260 | 5.537 |
| d2 | 6.387 | 3.577 | 1.300 |
| d3 | 4.605 | 2.669 | 0.500 |
| d4 | 2.084 | 2.893 | 4.057 |
| d5 | 2.760 | 3.887 | 4.892 |

Lens Group Data

| Group | Starting surface | Focal length |
|---|---|---|
| 1 | 1 | 16.51 |
| 2 | 7 | −5.92 |
| 3 | 13 | 22.64 |
| 4 | 15 | 9.79 |
| 5 | 20 | −13.92 |
| 6 | 22 | 114.99 |

Movement Amount of Focal Point Due to Temperature Change in Plastic Lenses

|  | Wide-angle end | Intermediate focal length | Telephoto-end |
|---|---|---|---|
| f | 6.87 | 11.50 | 19.57 |
| Movement amount of focal point | −0.035 | −0.044 | −0.053 |

Example 5

Figure 20:
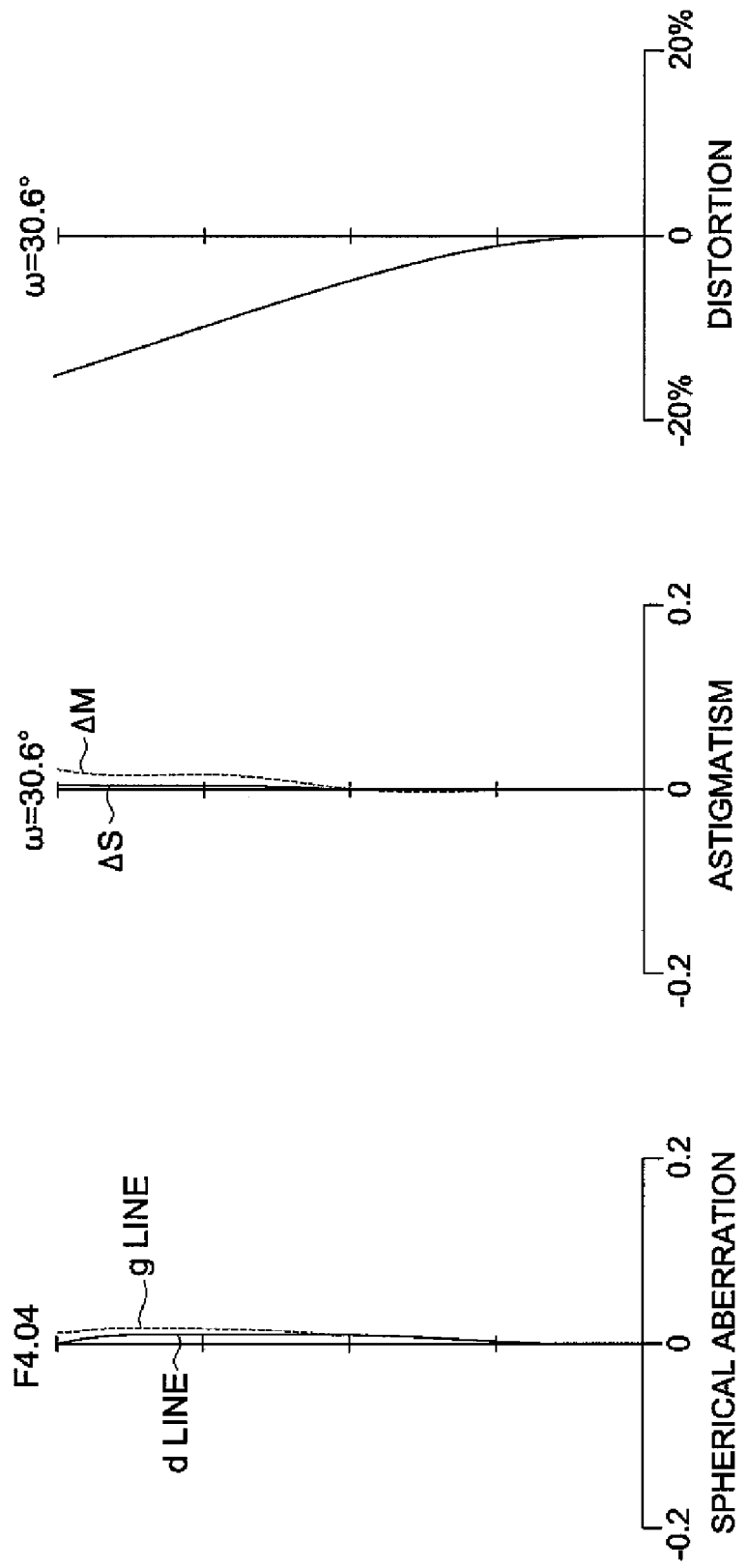
FIG. 20 is a diagram of aberrations at the wide-angle end of Example 5.
Figure 21:
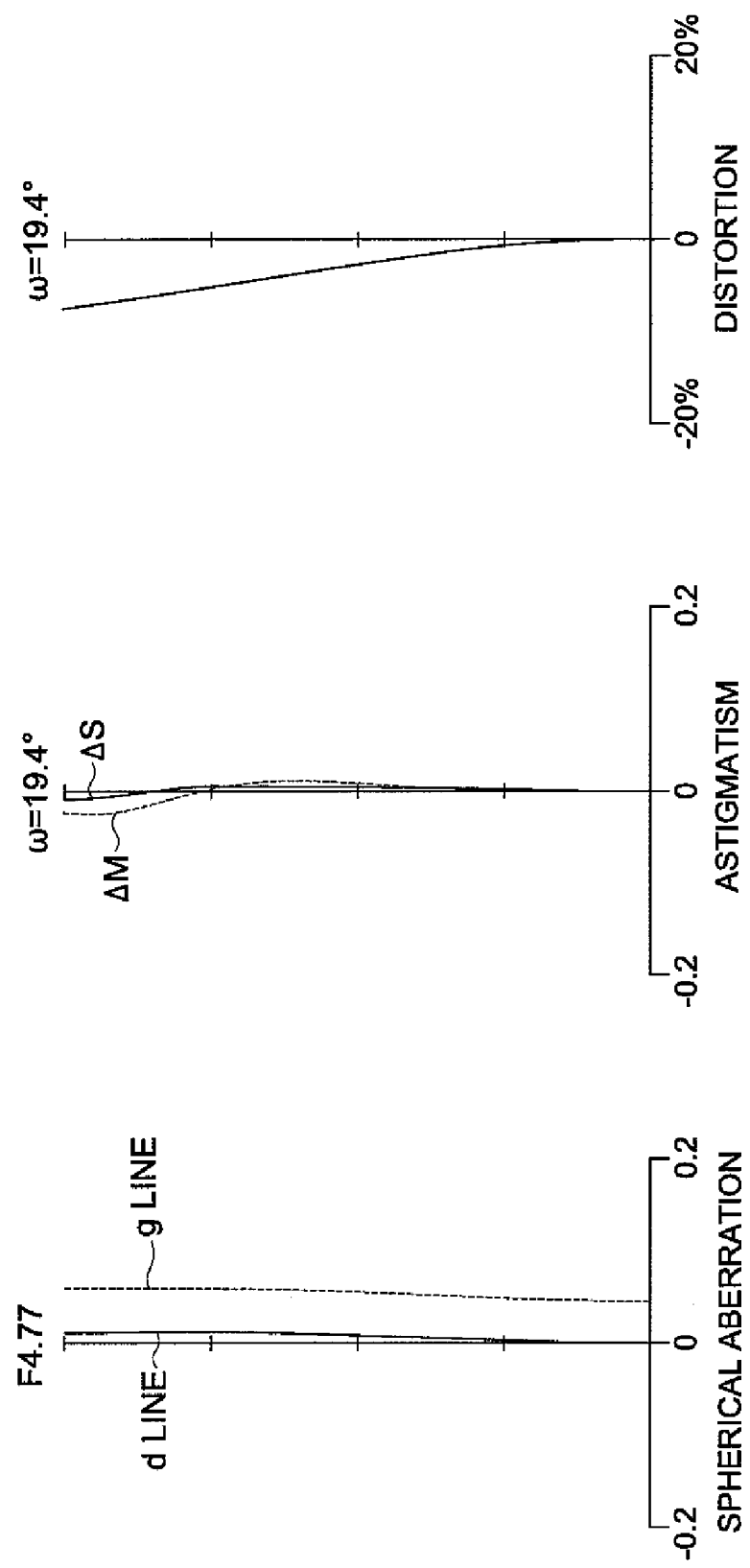
FIG. 21 is a diagram of aberrations at the intermediate focal length of Example 5.
Figure 22:
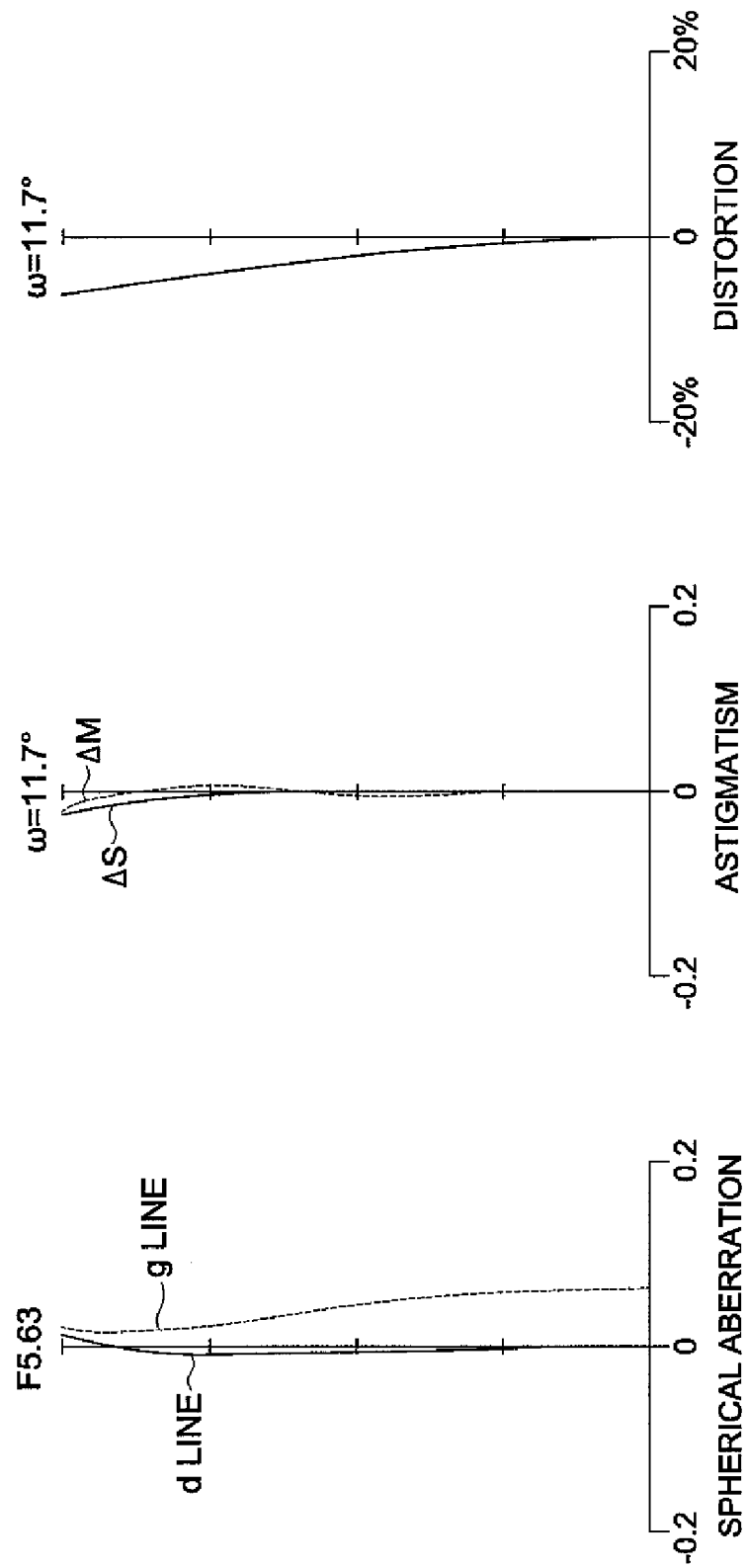
FIG. 22 is a diagram of aberrations at the telephoto end of Example 5.
Figure 23:
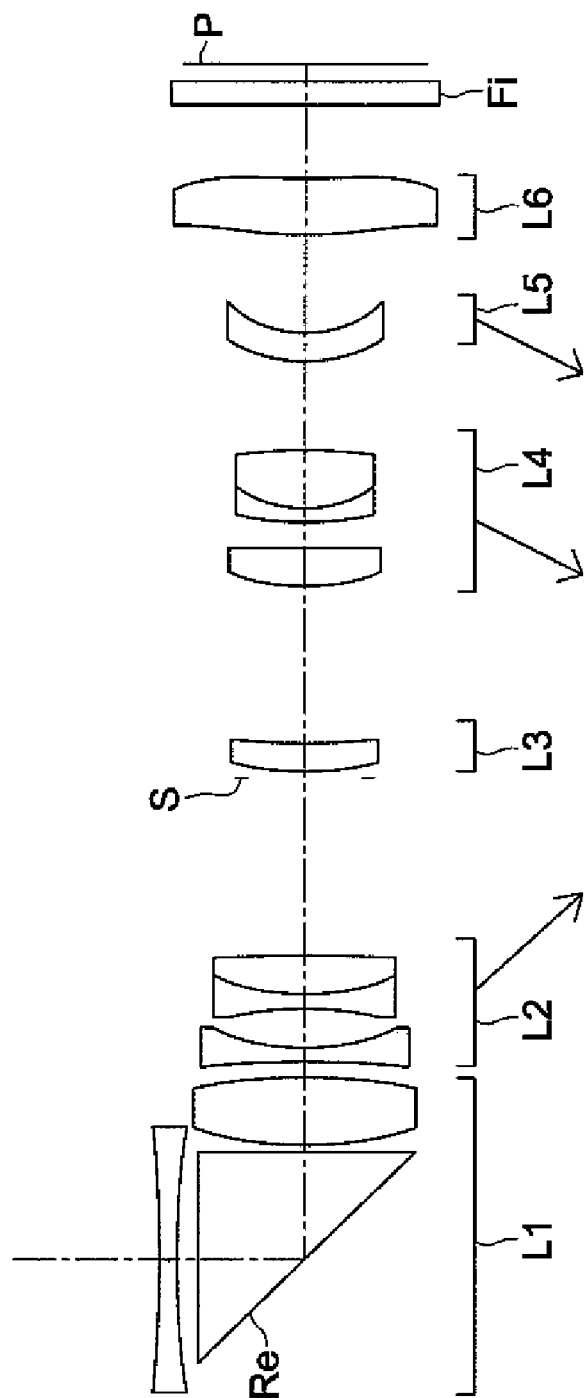
FIG. 23 is a diagram of a lens structure of the wide-angle end of Example 6.

Table 5 shows lens surface data of Example 5. FIG. 20 shows aberration diagrams at the wide-angle end, FIG. 21 shows aberration diagrams at the intermediate focal length, and FIG. 22 shows aberration diagrams at the telephoto end.

In the zoom lens in Example 5, the tenth lens formed by the lens surfaces 20 and 21, and the eleventh lens formed by the surfaces 22 and 23 are plastic lenses. The diagonal length of the image pickup element 2Y is 7.812.

TABLE 5

| Surface No. | R (m) | d (mm) | $n_d$ | $v_d$ |
|---|---|---|---|---|
| 1 | −63.201 | 0.60 | 1.90681 | 21.2 |
| 2 | 23.245 | 0.84 | | |
| 3 | ∞ | 7.24 | 1.84666 | 23.8 |
| 4 | ∞ | 0.20 | | |
| 5 (*) | 12.736 | 2.31 | 1.80139 | 45.4 |
| 6 (*) | −22.156 | d1 (Variable) | | |
| 7 | −44.307 | 0.50 | 1.90366 | 31.3 |
| 8 | 7.549 | 1.28 | | |
| 9 | −12.799 | 0.50 | 1.72916 | 54.7 |
| 10 | 8.085 | 1.23 | 1.90681 | 21.2 |
| 11 | −937.000 | d2 (Variable) | | |
| 12 (Stop) | ∞ | 0.20 | | |
| 13 (*) | 11.203 | 0.92 | 1.80892 | 40.5 |
| 14 | 31.415 | d3 (Variable) | | |
| 15 (*) | 7.081 | 1.23 | 1.58313 | 59.4 |
| 16 | 119.136 | 1.16 | | |
| 17 | 11.573 | 0.50 | 1.90366 | 31.3 |
| 18 | 4.374 | 1.88 | 1.49700 | 81.6 |
| 19 | −15.916 | d4 (Variable) | | |
| 20 (*) | 8.383 | 0.90 | 1.60700 | 27.0 |
| 21 (*) | 4.642 | d5 (Variable) | | |
| 22 (*) | 9.112 | 1.59 | 1.53048 | 55.7 |
| 23 (*) | 10.062 | 2.84 | | |
| 24 | ∞ | 0.85 | 1.51633 | 64.2 |
| 25 | ∞ | | | |

Aspheric surface coefficient

5th surface

K = 0
A4 = −1.00612E−04
A6 = −5.65833E−06
A8 = 6.71358E−07
A10 = −3.13811E−08
A12 = 5.28309E−10
6th surface

K = 0
A4 = 3.10282E−05
A6 = −6.37579E−06
A8 = 9.60967E−07

-continued

Aspheric surface coefficient

A10 = −5.17969E−08
A12 = 9.91337E−10
13th surface

K = 0
A4 = −1.16542E−04
A6 = −5.86821E−06
A8 = 1.27237E−06
A10 = −1.54113E−07
15th surface K = 0
A4 = −3.29922E−04
A6 = 7.12583E−06
A8 = −1.35164E−06
A10 = 1.33919E−07
20th surface K = 0
A4 = −3.00500E−04
A6 = 2.34037E−05
A8 = −1.45128E−05
A10 = 1.92611E−06
21st surface K = 0
A4 = −3.41301E−04
A6 = 6.74802E−05
A8 = −3.29495E−05
A10 = 3.53626E−06
22nd surface K = 0
A4 = −3.23229E−03
A6 = 3.54187E−04
A8 = −3.02748E−05
A10 = 1.57904E−06
A12 = −3.82727E−08
23rd surface K = 0
A4 = −5.88641E−03
A6 = 5.07681E−04
A8 = −4.02984E−05
A10 = 1.96042E−06
A12 = −4.37830E−08

Various Data for Zooming
Zoom ratio: 2.85

|  | Wide-angle end | Intermediate focal length | Telephoto-end |
|---|---|---|---|
| Focal length | 6.87 | 11.50 | 19.57 |
| F number | 4.04 | 4.77 | 5.63 |
| Half angle of view | 30.6 | 19.4 | 11.7 |
| Image height | 3.42 | 3.74 | 3.80 |
| Total length of lens system | 44.39 | 44.38 | 44.39 |
| Back focal length | 4.00 | 3.99 | 4.01 |
| d1 | 0.450 | 2.909 | 5.012 |
| d2 | 5.769 | 3.310 | 1.207 |
| d3 | 5.035 | 2.840 | 0.500 |
| d4 | 2.523 | 2.878 | 3.161 |
| d5 | 3.526 | 5.365 | 7.423 |

Zoom Lens Group Data

| Group | Starting surface | Focal length |
|---|---|---|
| 1 | 1 | 14.06 |
| 2 | 7 | −5.57 |
| 3 | 13 | 21.10 |
| 4 | 15 | 10.96 |
| 5 | 20 | −18.85 |
| 6 | 22 | 115.00 |

Movement Amount of Focal Point Due to Temperature Change in Plastic Lenses

|  | Wide-angle end | Intermediate focal length | Telephoto-end |
|---|---|---|---|
| f | 6.87 | 11.50 | 19.57 |
| Movement amount of focal point | −0.023 | −0.034 | −0.048 |

Example 6

Figure 24:
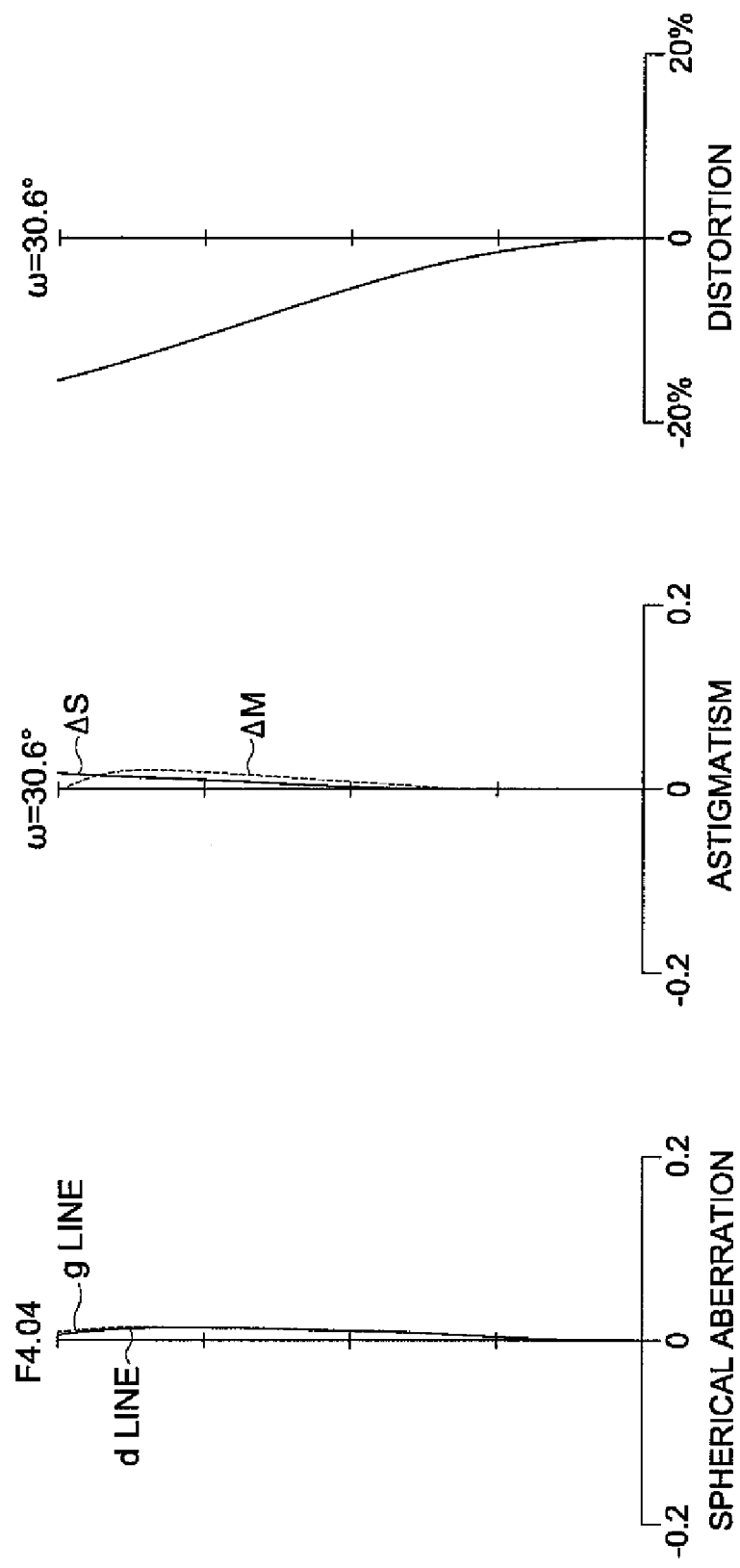
FIG. 24 is a diagram of aberrations at the wide-angle end of Example 6.
Figure 25:
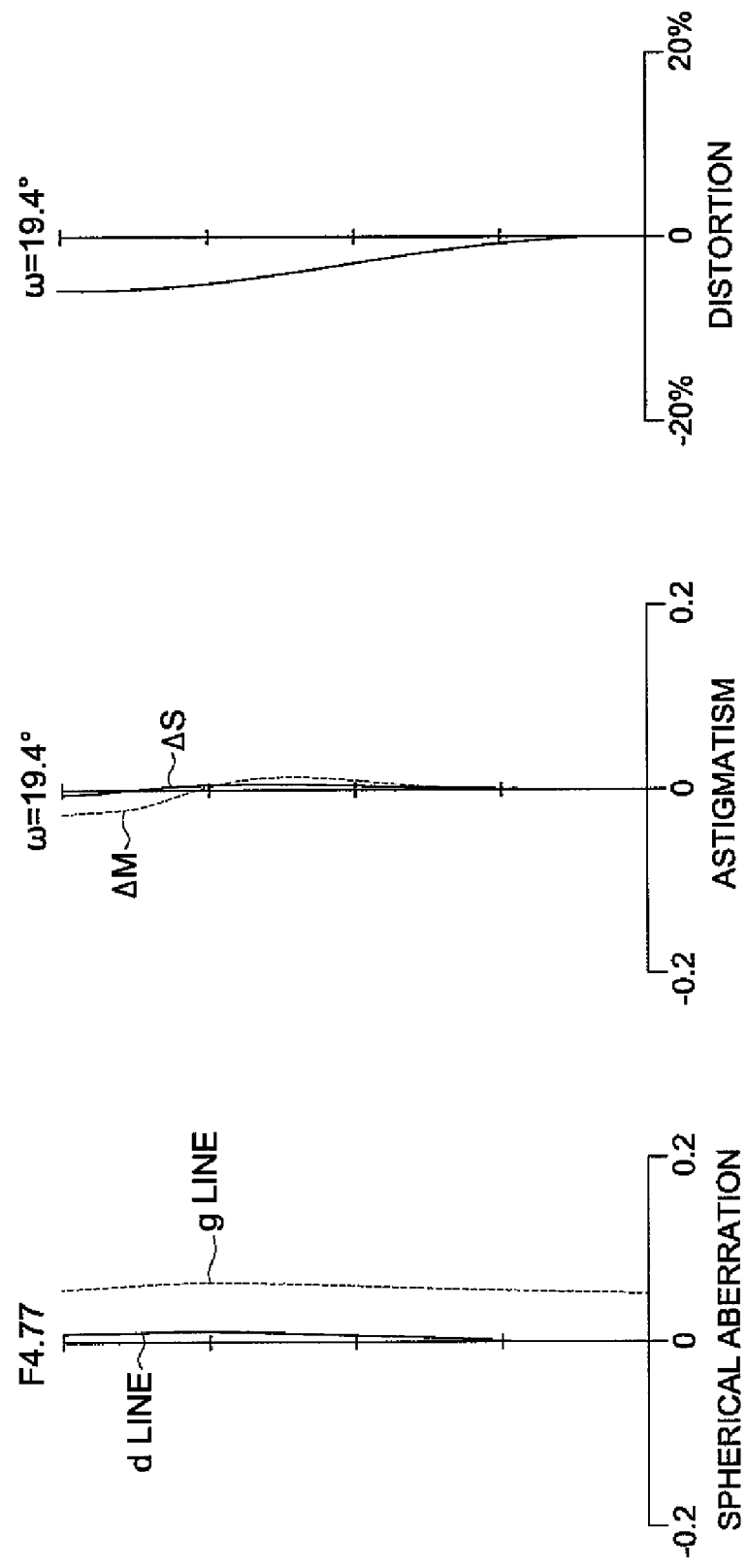
FIG. 25 is a diagram of aberrations at the intermediate focal length of Example 6.
Figure 26:
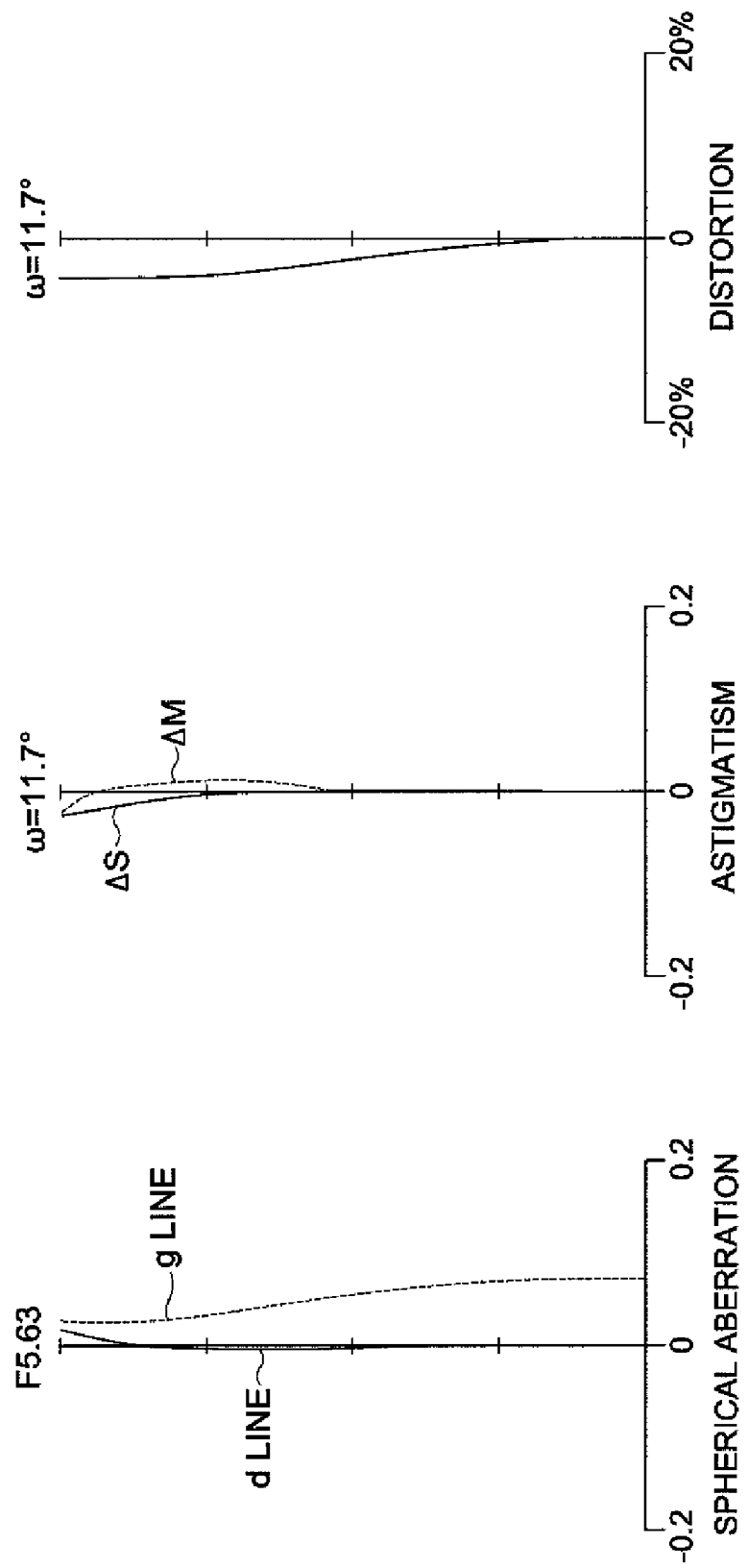
FIG. 26 is a diagram of aberrations at the telephoto end of Example 6.

Table 6 shows lens surface data of Example 6. FIG. 24 shows aberration diagrams at the wide-angle end, FIG. 25 shows aberration diagrams at the intermediate focal length, and FIG. 26 shows aberration diagrams at the telephoto end.

In the zoom lens in Example 6, the tenth lens formed by the lens surfaces 20 and 21, and the eleventh lens formed by the surfaces 22 and 23 are plastic lenses. The diagonal length of the image pickup element 2Y is 7.812.

TABLE 6

| Surface No. | R (m) | d (mm) | $n_d$ | $v_d$ |
|---|---|---|---|---|
| 1 | −40.544 | 0.60 | 1.92110 | 22.4 |
| 2 | 29.995 | 0.69 |  |  |
| 3 | ∞ | 7.24 | 1.84666 | 23.8 |
| 4 | ∞ | 0.20 |  |  |
| 5 (*) | 13.820 | 2.32 | 1.80139 | 45.4 |
| 6 (*) | −19.944 | d1 (Variable) |  |  |
| 7 | −41.166 | 0.50 | 1.90366 | 31.3 |
| 8 | 7.616 | 1.30 |  |  |
| 9 | −12.754 | 0.50 | 1.72916 | 54.7 |
| 10 | 8.089 | 1.27 | 1.92110 | 22.4 |
| 11 | −180.221 | d2 (Variable) |  |  |
| 12 (Stop) | ∞ | 0.20 |  |  |
| 13 (*) | 10.571 | 0.93 | 1.80892 | 40.5 |
| 14 | 28.627 | d3 (Variable) |  |  |
| 15 (*) | 7.369 | 1.24 | 1.58313 | 59.4 |
| 16 | −244.489 | 0.87 |  |  |
| 17 | 12.582 | 0.50 | 1.90366 | 31.3 |
| 18 | 4.284 | 1.85 | 1.49700 | 81.6 |
| 19 | −21.061 | d4 (Variable) |  |  |
| 20 (*) | 5.218 | 0.89 | 1.60700 | 27.0 |
| 21 (*) | 3.556 | d5 (Variable) |  |  |
| 22* | 11.492 | 1.83 | 1.53048 | 55.7 |
| 23 (*) | 13.377 | 2.47 |  |  |
| 24 | ∞ | 0.78 | 1.51633 | 64.2 |
| 25 | ∞ |  |  |  |

Aspheric surface coefficient

5th surface

K = 0
A4 = −1.06012E−04
A6 = −5.40796E−06
A8 = 7.12809E−07
A10 = −3.23538E−08
A12 = 5.97394E−10
6th surface K = 0
A4 = 2.74851E−05
A6 = −5.88210E−06
A8 = 9.66924E−07
A10 = −4.98151E−08
A12 = 9.83116E−10
13th surface K = 0
A4 = −1.28727E−04
A6 = −5.95887E−06
A8 = 1.12441E−06
A10 = −1.28753E−07
15th surface K = 0
A4 = −3.18593E−04
A6 = 9.83999E−06
A8 = −1.43800E−06
A10 = 1.37381E−07
20th surface K = 0
A4 = 3.26510E−04
A6 = 6.85861E−06
A8 = −1.64181E−05
A10 = 1.89533E−06
21st surface K = 0
A4 = −2.46990E−04
A6 = 1.19056E−06
A8 = −4.31224E−05
A10 = 3.70871E−06
22nd surface K = 0
A4 = −3.52353E−03
A6 = 3.39536E−04
A8 = −3.09308E−05
A10 = 1.66310E−06
A12 = −3.65145E−08
23rd surface K = 0
A4 = −6.55134E−03
A6 = 5.13038E−04
A8 = −3.99815E−05
A10 = 1.91978E−06
A12 = −3.80232E−08

Various Data for Zooming
Zoom ratio: 2.85

|  | Wide-angle end | Intermediate focal length | Telephoto-end |
|---|---|---|---|
| Focal length | 6.87 | 11.50 | 19.57 |
| F number | 4.04 | 4.77 | 5.63 |
| Half angle of view | 30.6 | 19.4 | 11.7 |
| Image height | 3.42 | 3.81 | 3.87 |
| Total length of lens system | 44.42 | 44.40 | 44.42 |
| Back focal length | 3.58 | 3.56 | 3.58 |
| d1 | 0.450 | 2.962 | 5.170 |
| d2 | 5.913 | 3.401 | 1.193 |
| d3 | 5.232 | 2.918 | 0.500 |
| d4 | 3.010 | 3.051 | 3.000 |
| d5 | 3.314 | 5.587 | 8.056 |

Lens Group Data

| Group | Starting surface | Focal length |
|---|---|---|
| 1 | 1 | 14.38 |
| 2 | 7 | −5.79 |
| 3 | 13 | 20.25 |
| 4 | 15 | 12.11 |
| 5 | 20 | −23.03 |
| 6 | 22 | 115.01 |

Movement Amount of Focal Point Due to Temperature Change in Plastic Lenses

|  | Wide-angle end | Intermediate focal length | Telephoto-end |
|---|---|---|---|
| f | 6.87 | 11.50 | 19.57 |
| Movement amount of focal point | −0.014 | −0.023 | −0.035 |

Table 7 shows the values corresponding to conditional expressions for Example 1-6

TABLE 7

|  | $n_{1n}$ | $v_{1n}$ | $d_{L1PR}/(2Y/f_W)$ | $n_{2p}$ | $v_{2p}$ | $|f_2/f_W|$ | $f_4/f_W$ | $|f_W/f_5|$ | $f_W/f_6$ |
|---|---|---|---|---|---|---|---|---|---|
| Ex. 1 | 1.94595 | 18.0 | 4.64 | 1.94595 | 18.0 | 0.69 | 1.44 | 0.46 | 0.08 |
| Ex. 2 | 1.94595 | 18.0 | 4.66 | 1.94595 | 18.0 | 0.70 | 1.43 | 0.44 | 0.06 |
| Ex. 3 | 1.94595 | 18.0 | 4.20 | 1.94595 | 18.0 | 0.68 | 1.56 | 0.35 | — |
| Ex. 4 | 2.14350 | 17.8 | 4.92 | 2.14350 | 17.8 | 0.86 | 1.42 | 0.49 | 0.06 |
| Ex. 5 | 1.90681 | 21.2 | 4.45 | 1.90681 | 21.2 | 0.81 | 1.60 | 0.36 | 0.06 |
| Ex. 6 | 1.92110 | 22.4 | 4.32 | 1.92110 | 22.4 | 0.84 | 1.76 | 0.30 | 0.06 |

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A zoom lens for forming an image of an object on an image pickup surface of an image pickup element, the zoom lens comprising, in order from an object side thereof:
   a first lens group with a positive refractive power;
   a second lens group with a negative refractive power;
   a third lens group with a positive refractive power;
   a fourth lens group with a positive refractive power; and
   a fifth lens group with a negative refractive power,
   wherein a power of the zoom lens varies by moving the second lens group, the fourth lens group, and the fifth lens group along an optical axis,
   the first lens group comprises a reflection optical element for bending an optical path by reflecting a light flux, a positive lens, and a negative lens satisfying the following expressions:

$n_{1n} > 1.90$, $v_{1n} < 25$, where $n_{1n}$ is a refractive index of the negative lens in the first lens group at d line, and
   $v_{1n}$ is an Abbe number of the negative lens in the first lens group,
   wherein the fifth lens group consists of one negative lens and satisfies the following expression:

$|f_W/f_5| < 0.5$, where $f_W$ is a focal length of a total system of the zoom lens at a wide-angle end, and
   $f_5$ is a focal length of the fifth lens group,
   wherein the zoom lens adjusts a focal point from an infinity distance to a finite distance by moving the fifth lens group.

2. The zoom lens of claim 1, wherein the negative lens satisfies the following expressions:

$n_{1n} > 1.93$, $v_{1n} < 20$.

3. The zoom lens of claim 1, wherein the negative lens in the first lens group is arranged at a closer position to the object than the reflection optical element, and the zoom lens satisfies the following expression:

$3 < d_{L1PR}/(2Y/f_W) < 7$, where $d_{L1PR}$ is a distance along the optical axis from a tip of an object side surface of the negative lens in the first lens group to a reflection surface of the reflection optical element,
   2Y is a diagonal length of the image pickup element, and
   $f_W$ is a focal length of a total system of the zoom lens at a wide-angle end.

4. The zoom lens of claim 1, wherein the negative lens in the first lens group is arranged at a closer position to the object than the reflection optical element, and the zoom lens satisfies the following expression:

$4 < d_{L1PR}/(2Y/f_W) < 6$, where $d_{L1PR}$ is a distance along the optical axis from a tip of an object side surface of the negative lens in the first lens group to a reflection surface of the reflection optical element,
   2Y is a diagonal length of the image pickup element, and
   $f_W$ is a focal length of a total system of the zoom lens at a wide-angle end.

5. The zoom lens of claim 1, wherein the second lens group comprises a positive lens satisfying the following expressions, and a negative lens:

$n_{2p} > 1.90$, $v_{2p} < 25$, where $n_{2p}$ is a refractive index of the positive lens in the second lens group at d line and
   $v_{2p}$ is an Abbe number of the positive lens in the second lens group.

6. The zoom lens of claim 1, wherein the zoom lens satisfies the following expression:

$0.4 < |f_2/f_W| < 1.0$, where $f_2$ is a focal length of the second lens group, and
   $f_W$ is a focal length of a total system of the zoom lens at a wide-angle end.

7. The zoom lens of claim 1, wherein the zoom lens satisfies the following expression:

$0.5 < |f_2/f_W| < 0.9$, where $f_2$ is a focal length of the second lens group, and
   $f_W$ is a focal length of a total system of the zoom lens at a wide-angle end.

8. The zoom lens of claim 1, further comprising
   an aperture stop arranged adjacent to the third lens group along the optical axis,
   wherein the third lens group comprises an aspheric surface and the third lens group is statically positioned for varying the power of the zoom lens.

9. The zoom lens of claim 1, wherein the third lens group consists of one positive lens.

10. The zoom lens of claim 1, wherein a lens arranged at a closest position to the object in the fourth lens group, comprises an aspheric surface.

11. The zoom lens of claim 1, wherein the zoom lens satisfies the following expression:

$1.0 < f_4/f_W < 2.0$, where $f_4$ is a focal length of the fourth lens group, and
    $f_W$ is a focal length of a total system of the zoom lens at a wide-angle end.

12. The zoom lens of claim 1, wherein the zoom lens satisfies the following expression:

$1.2 < f_4/f_W < 1.8$, where $f_4$ is a focal length of the fourth lens group, and
    $f_W$ is a focal length of a total system of the zoom lens at a wide-angle end.

13. The zoom lens of claim 1, wherein the fifth lens group consists of one negative plastic lens.

14. The zoom lens of claim 1, further comprising: a sixth lens group with a positive refractive power, consisting of one positive plastic lens, arranged at a closer position to the image than the fifth lens group, and satisfying the following expression:

$f_W/f_6 < 0.15$, where $f_W$ is a focal length of a total system of the zoom lens at a wide-angle end, and
    $f_6$ is a focal length of the sixth lens group.

15. The zoom lens of claim 1, further comprising: a sixth lens group with a positive refractive power, consisting of one positive plastic lens, arranged at a closer position to the image than the fifth lens group, and satisfying the following expression:

$$f_W/f_6 < 0.10,$$

where $f_W$ is a focal length of a total system of the zoom lens at a wide-angle end, and $f_6$ is a focal length of the sixth lens group.

16. An image pickup apparatus, comprising:
an image pickup element comprising a photoelectric converter, and
the zoom lens of claim 1.

17. A zoom lens for forming an image of an object on an image pickup surface of an image pickup element, the zoom lens comprising, in order from an object side thereof:
a first lens group with a positive refractive power;
a second lens group with a negative refractive power;
a third lens group with a positive refractive power;
a fourth lens group with a positive refractive power; and
a fifth lens group with a negative refractive power,
wherein a power of the zoom lens varies by moving the second lens group, the fourth lens group, and the fifth lens group along an optical axis,
the first lens group comprises a reflection optical element for bending an optical path by reflecting a light flux,
the second lens group comprises a positive lens satisfying the following expressions, and a negative lens:

$$n_{2p} > 1.90,$$

$$v_{2p} < 25,$$

where $n_{2p}$ is a refractive index of the positive lens in the second lens group at d line and $v_{2p}$ is an Abbe number of the positive lens in the second lens group, wherein the zoom lens satisfies the following expression:

$$0.5 < |f_2/f_W| < 0.9,$$

where $f_2$ is a focal length of the second lens group, and $f_W$ is a focal length of a total system of the zoom lens at a wide-angle end, and the fifth lens group consists of one negative lens and satisfies the following expression:

$$|f_W/f_5| < 0.5,$$

where $f_5$ is a focal length of the fifth lens group, wherein the zoom lens adjusts a focal point from an infinity distance to a finite distance by moving the fifth lens group.

18. The zoom lens of claim 17, wherein the negative lens in the second lens group satisfies the following expressions:

$$n_{2p} > 1.93,$$

$$v_{2p} < 20.$$

19. The zoom lens of claim 17, wherein the first lens group comprises a positive lens and a negative lens satisfying the following expressions:

$$n_{1n} > 1.90,$$

$$v_{1n} < 25,$$

where $n_{1n}$ is a refractive index of the negative lens in the first lens group at d line, and $v_{1n}$ is an Abbe number of the negative lens in the first lens group.

20. The zoom lens of claim 17, further comprising
an aperture stop arranged adjacent to the third lens group along the optical axis, wherein the third lens group comprises an aspheric surface and the third lens group is statically positioned for varying the power of the zoom lens.

21. The zoom lens of claim 17, wherein the third lens group consists of one positive lens.

22. The zoom lens of claim 17, wherein a lens arranged at a closest position to the object in the fourth lens group, comprises an aspheric surface.

23. The zoom lens of claim 17, wherein the zoom lens satisfies the following expression:

$$1.0 < f_4/f_W < 2.0,$$

where $f_4$ is a focal length of the fourth lens group, and $f_W$ is a focal length of a total system of the zoom lens at a wide-angle end.

24. The zoom lens of claim 17, wherein the zoom lens satisfies the following expression:

$$1.2 < f_4/f_W < 1.8,$$

where $f_4$ is a focal length of the fourth lens group, and $f_W$ is a focal length of a total system of the zoom lens at a wide-angle end.

25. The zoom lens of claim 17, wherein the fifth lens group consists of one negative plastic lens.

26. The zoom lens of claim 17, further comprising:
a sixth lens group with a positive refractive power, consisting of one positive plastic lens, arranged at a closer position to the image than the fifth lens group, and satisfying the following expression:

$$f_W/f_6 < 0.15,$$

where $f_W$ is a focal length of a total system of the zoom lens at a wide-angle end, and $f_6$ is a focal length of the sixth lens group.

27. The zoom lens of claim 17, further comprising:
a sixth lens group with a positive refractive power, consisting of one positive plastic lens, arranged at a closer position to the image than the fifth lens group, and satisfying the following expression:

$$f_W/f_6 < 0.10,$$

where $f_W$ is a focal length of a total system of the zoom lens at a wide-angle end, and $f_6$ is a focal length of the sixth lens group.

28. An image pickup apparatus, comprising:
an image pickup element comprising a photoelectric converter, and the zoom lens of claim 17.

* * * * *